United States Patent [19]
Billington et al.

[11] Patent Number: 5,963,884
[45] Date of Patent: Oct. 5, 1999

[54] PREDICTIVE MAINTENANCE SYSTEM

[75] Inventors: Ralph D. Billington, Oak Ridge; Daren L. Martin, Knoxville, both of Tenn.

[73] Assignee: Machine Xpert, LLC, Knoxville, Tenn.

[21] Appl. No.: 08/724,528

[22] Filed: Sep. 30, 1996

Related U.S. Application Data

[60] Provisional application No. 60/026,938, Sep. 23, 1996, and provisional application No. 60/026,941, Sep. 23, 1996.

[51] Int. Cl.[6] .................................................. G21C 17/00
[52] U.S. Cl. ............................................................. 702/56
[58] Field of Search ................................... 364/508, 506, 364/551.01; 702/56, 34, 184; 73/584, 593, 577

[56] References Cited

U.S. PATENT DOCUMENTS

| 4,060,716 | 11/1977 | Pekrul et al. | 702/184 |
|---|---|---|---|
| 4,336,595 | 6/1982 | Adams et al. | 364/508 |
| 4,480,480 | 11/1984 | Scott et al. | 73/769 |
| 4,985,857 | 1/1991 | Bajpai et al. | 364/551.01 |
| 5,195,046 | 3/1993 | Geradi et al. | 364/506 |
| 5,311,562 | 5/1994 | Palusamy et al. | 376/215 |
| 5,421,204 | 6/1995 | Svaty, Jr. | 73/786 |
| 5,445,347 | 8/1995 | Ng | 246/169 |

OTHER PUBLICATIONS

Microsoft Press Computer Dictionary Third Edition, p. 37, 1997.

Primary Examiner—James P. Trammell
Assistant Examiner—Matthew Smithers
Attorney, Agent, or Firm—Banner & Witcoff, Ltd.

[57] ABSTRACT

A predictive maintenance system for a plurality of machines is disclosed. The system includes vibration sensors connected to the machines and a plurality of data acquisition nodes, each node connected to one or more of the vibration sensors. Each node acquires vibration data from the sensors connected thereto during a respective data acquisition interval. A system control computer collects vibration data acquired by the nodes during a polling cycle which is based on the longest of the respective data acquisition cycles of the nodes.

32 Claims, 27 Drawing Sheets

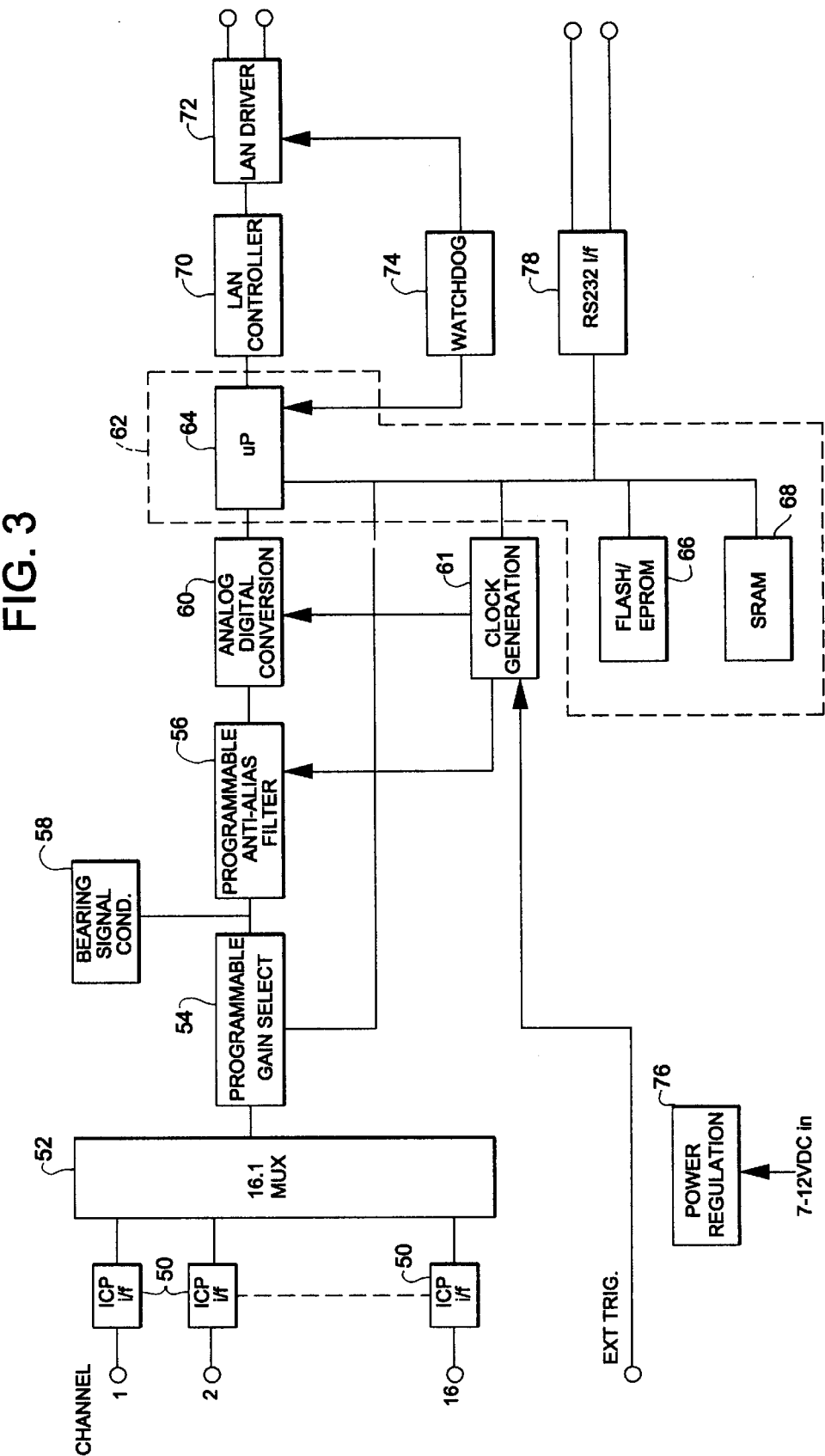

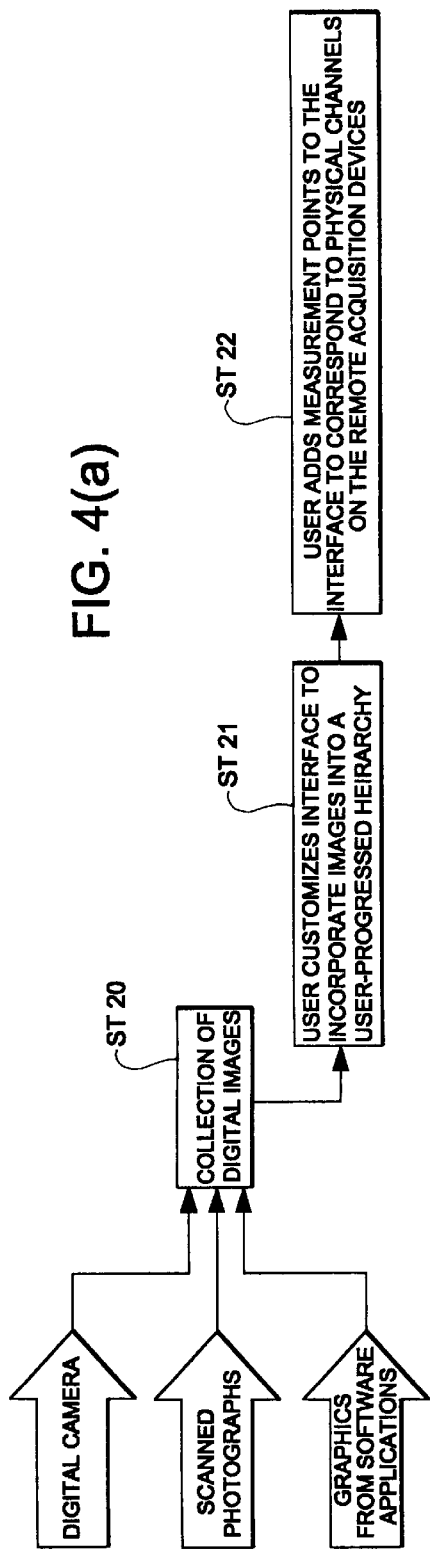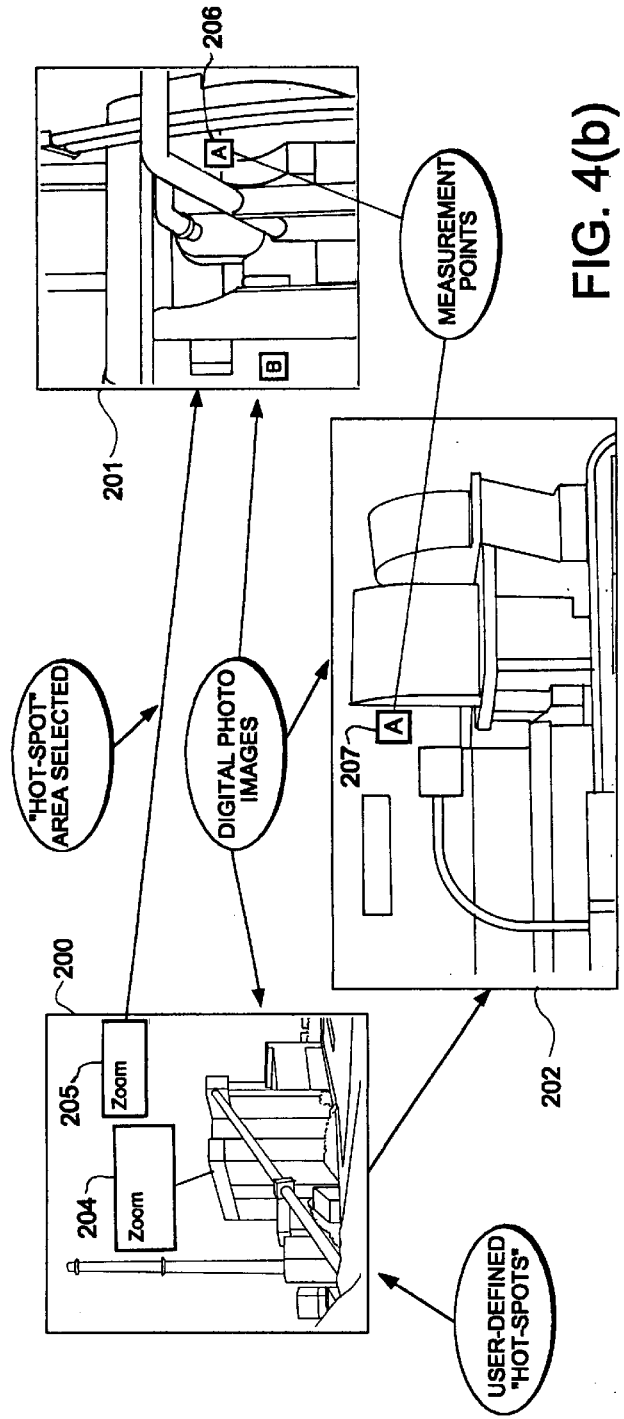

● Possible Causes    ○ Symptoms    ○ Actions    ○ Notes    ○ Full Report    ○ User Alarms ........ ANALYSIS RESULTS - Possible Causes ........

Analysis has been performed 9/25/96 7:10:39 PM
on data acquired 2/15/95 11:00:00 AM Results for machine CASE-5 after assessing point(s) A

▶ POTENTIAL FAILURES IDENTIFIED

Most likely causes include:

Aerodynamic Imbalance accross the first stage fan disk - A

Other possible causes include:

Looseness of the fan shaft, first stage disk or blades - A

▶ PROBLEMS THAT ARE DEVELOPING

Most likely causes include:

| Copy | Save | Print | Backwards | Forwards | Tools | Exit |

Machine Path: C:\EXPERT\DATA\ONLINE\CONV\CASE-4\

Start Point: A    Number of Points: 2

High Freq. = Data Freq. Range

| Broadband: | High | Low |
|---|---|---|
| Overall | 2000 | 5 |
| Bearing | 2000 | 100 |
| Balance | 100 | 5 |

Fan shaft rotational speed: [Hertz ▼] 2000

Frequency range to sample [Hz]: [▼] 2000    Lines of Resolution: [▼] 1600

Tolerances from Baseline
Normal 0 %    High 250 %    Too High 450 %

Broadband Tolerances
Machine Off 20 %    High 250 %    Too High 450 %

Alarm Width: [▼] 4 Lines

Enter the NUMBER OF BLADES

| Fan Location | Stage 1 |
|---|---|
| Fan Shaft | |

Enter the NORMALIZED BEARING DEFECT FREQUENCY for each location

| Bearing Location | Ref. No. | Outer Race | Inner Race | Roller | Cage |
|---|---|---|---|---|---|
| Fan Shaft Inboard | | | | | |
| Fan Shaft Outboard | | | | | |

☒ Subdivide Files
☒ Overlap Checking Enabled

[ OK ]    [ Cancel ]

FIG. 8

Scan Options
- ☒ Overall Levels: [9 ▸]
- ☐ Require Passwords

Scan Interval:
[◂ 3.93 ▸] [Seconds ▸]
[Set to Minimum]
[Data Collection, Analysis and System Display Refresh Rate. Current Min: 3.93 Seconds]

File Storage Options
- ☒ Store Data Files
- File Depth per Channel: [1000]

File Storage Interval:
[◂ 5.00 ▸] [Seconds ▸]
[Set to Minimum]
[Data Storage and Analysis Log Updates; Current Min: 3.93 Seconds]

Analysis Options
- ☒ Perform Analysis
- ☒ Maintain History Log
- ☒ Data Quality Check
- ☐ Store On Alarm

[OK]

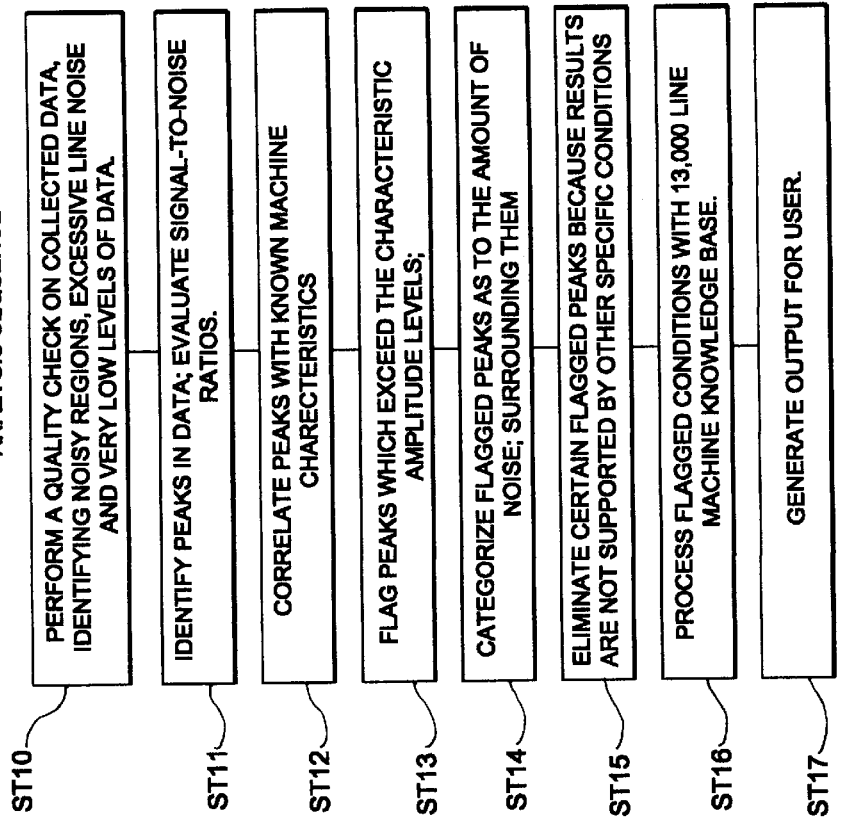

FIG. 9(b)

ANALYSIS SEQUENCE

- ST10: PERFORM A QUALITY CHECK ON COLLECTED DATA, IDENTIFYING NOISY REGIONS, EXCESSIVE LINE NOISE AND VERY LOW LEVELS OF DATA.
- ST11: IDENTIFY PEAKS IN DATA; EVALUATE SIGNAL-TO-NOISE RATIOS.
- ST12: CORRELATE PEAKS WITH KNOWN MACHINE CHARECTERISTICS
- ST13: FLAG PEAKS WHICH EXCEED THE CHARACTERISTIC AMPLITUDE LEVELS;
- ST14: CATEGORIZE FLAGGED PEAKS AS TO THE AMOUNT OF NOISE; SURROUNDING THEM
- ST15: ELIMINATE CERTAIN FLAGGED PEAKS BECAUSE RESULTS ARE NOT SUPPORTED BY OTHER SPECIFIC CONDITIONS
- ST16: PROCESS FLAGGED CONDITIONS WITH 13,000 LINE MACHINE KNOWLEDGE BASE.
- ST17: GENERATE OUTPUT FOR USER.

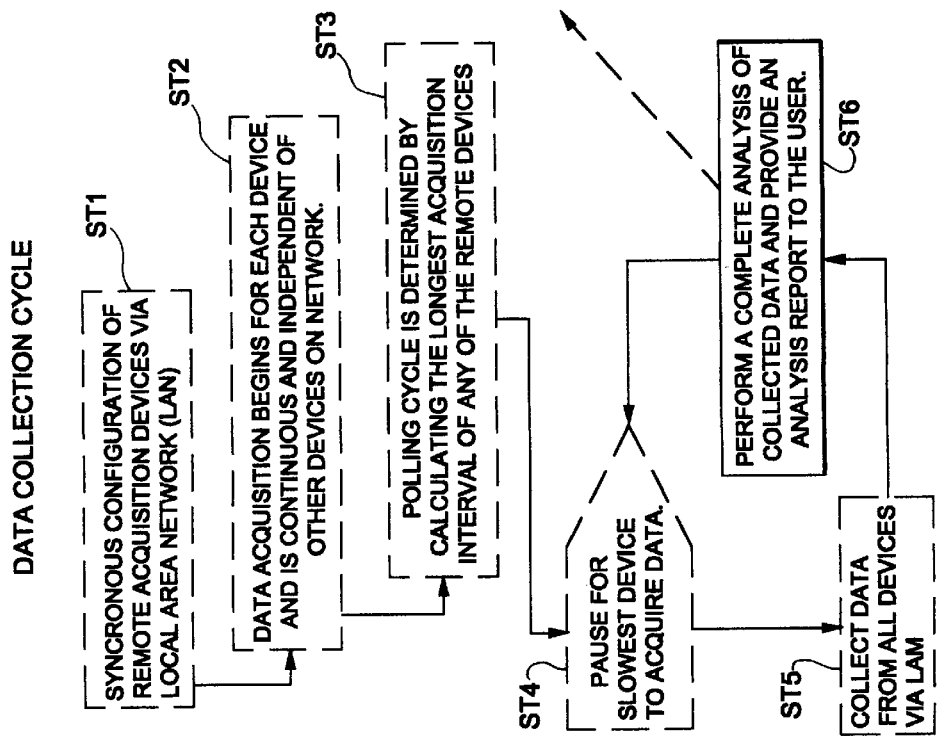

FIG. 9(a)

DATA COLLECTION CYCLE

- ST1: SYNCRONOUS CONFIGURATION OF REMOTE ACQUISITION DEVICES VIA LOCAL AREA NETWORK (LAN)
- ST2: DATA ACQUISITION BEGINS FOR EACH DEVICE AND IS CONTINUOUS AND INDEPENDENT OF OTHER DEVICES ON NETWORK.
- ST3: POLLING CYCLE IS DETERMINED BY CALCULATING THE LONGEST ACQUISITION INTERVAL OF ANY OF THE REMOTE DEVICES
- ST4: PAUSE FOR SLOWEST DEVICE TO ACQUIRE DATA.
- ST5: COLLECT DATA FROM ALL DEVICES VIA LAM
- ST6: PERFORM A COMPLETE ANALYSIS OF COLLECTED DATA AND PROVIDE AN ANALYSIS REPORT TO THE USER.

PREDICTIVE MAINTENANCE SYSTEM

RELATED APPLICATIONS

The present application is related to a provisional patent application entitled "Data Collection System" filed Sep. 23, 1996 Ser. No. 60/026,938 and a provisional patent application entitled "Data Collection System" filed Sep. 23, 1996 Ser. No. 60/026,941. The contents of each of these provisional applications, from which priority is claimed under 35 U.S.C. Section 119(e), are incorporated herein by reference.

BACKGROUND OF THE INVENTION

1. Technical Field

The present invention generally relates to a predictive maintenance system and, more particularly, to a predictive maintenance system using a local area network (LAN) to control, to acquire, and to analyze data from a plurality of remote data acquisition nodes.

2. Description of Related Art

Various systems are known for analyzing vibration signatures of machines. One such prior art system uses a portable data collector having sensors which are connectable by a technician to a machine at one or more points to collect vibration data. The vibration signatures thus collected are downloaded to a personal computer, for example, which includes software for analyzing the vibration data. The software uses artificial intelligence, for example, to diagnose the risk of machine breakdown by first comparing the vibration signatures to earlier baseline signatures and then comparing any changes to a database of machine health-related characteristics and a knowledge base containing fault related scenarios. Since tiny changes in vibration data can indicate a machine fault, the software can predict the risk of breakdown. Such predictions can be used to shut down and/or effect repairs to machines before a catastrophic breakdown occurs, possibly resulting in reduced plant operations or, in some instances, plant shutdown.

Also known are predictive maintenance systems which do not require a technician to walk through a plant or facility to collect data. Such systems use permanently mounted sensors which are connected to a system controller for collecting vibration data. However, while such so-called "on-line" data collection systems are available, they generally function to collect data only and cannot perform automatic real-time expert analysis as part of the system's functionality. In addition, such systems often have complicated architectures. Still further, these systems generally have a text and menu driven interface, making it difficult for a user to configure and use the system.

SUMMARY OF THE INVENTION

The present invention provides a predictive maintenance system for informing a user of the operating characteristics of machines. The system utilizes a local area network to control, to acquire, and to analyze data from remote data acquisition nodes applied to predictive maintenance. The local area network, as applied, conforms to industry standard and local area network protocols. The present invention provides an on-line data acquisition system which has greater responsiveness and speed than prior art on-line systems and provides for an almost unlimited size of highway, running at the speed of the data acquisition process for the slowest of the remote data stations. The network of the present invention also provides for parallel data acquisition on an almost unlimited number of data acquisition devices providing for a plurality (e.g., sixteen) sensor inputs from each device.

The system of the present invention also includes a graphical interface that manages not only the navigation, but also the storing, retrieval, and analysis of machine information. This interface is constructed using graphical images obtained, for example, using digital cameras, photographic scanners, and/or software applications for creating graphical images. The interface uses these intuitive graphical images to help a user navigate through a complex system. The process of constructing the interface is performed entirely within the functionality of the system without the need to use external devices, external applications, or tools. A user may configure his/her own graphical interface by interfacing with a digital camera, scanner, or graphics software package. On-screen tools are used to customize the user's interface. At the time of constructing the interface, the data acquisition, storage, and analysis structure of the system are also created.

The system of the present invention utilizes an expert system to interpret machinery data as it is collected and presents conclusions to the user based on the application of a knowledge base in a real-time manner without affecting the data acquisition cycle time. Part of the analysis is to perform data quality assessment and to return conclusions of both the data quality and data analysis processes.

The features and advantages of the present invention will be better understood from a reading of the following detailed description in conjunction with the accompanying drawings.

BRIEF DESCRIPTION OF THE DRAWINGS

FIG. 3 is a block diagram of one of nodes 20 of the predictive maintenance system 5 of FIG. 1.

FIG. 4(a) is a flow diagram illustrating the construction of the interface of the present invention.

FIG. 4(b) is a schematic flow diagram illustrating the construction of the interface of the present invention.

FIG. 7 is an illustration of an order sheet creation utility.

FIG. 8 is a screen used for setting parameters for controlling the data collection cycle.

FIG. 9(a) is a logic and flow diagram of the configuration of remote data acquisition nodes and the data collection and analysis cycle.

FIG. 9(b) is a flow diagram of the analysis of ST 6 of FIG. 9(a).

DETAILED DESCRIPTION

The present invention provides a predictive maintenance system for automatically diagnosing and informing a user what, if anything, is wrong with machines in the user's facility or plant. The types of machines to which the predictive maintenance system of the invention may be applied include, but are not limited to, gearboxes, shearers, miners, turbines, pumps, power trains, motors, and fans. The diagnosis is accomplished by comparing current vibration signatures from machines with "ideal" vibration signature models for machines running in "good health". A vibration signature is a "fingerprint" that contains elements which are indicative of the health of a machine. A signature from a gearbox, for example, contains information relating to shaft rotation and alignment; the condition and quality of manufactured gears; the condition of the meshing of those gears; and the condition of the bearing within the gearbox.

Figure 1:
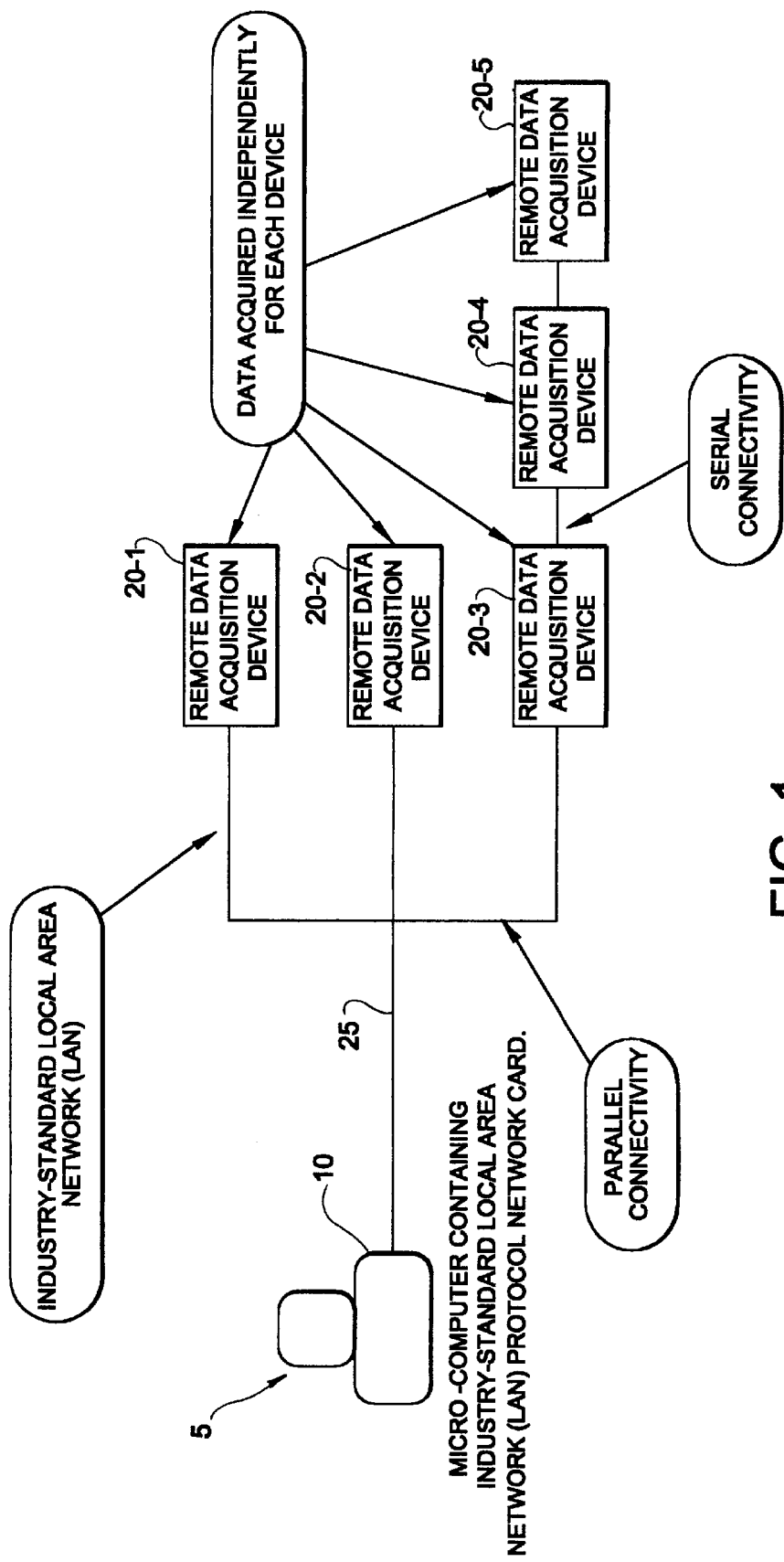
FIG. 1 illustrates a predictive maintenance system 5 using a local area network in accordance with the present invention.

The present invention uses a local area network (LAN) to control and to acquire data from a plurality of remote data acquisition nodes. FIG. 1 illustrates a predictive maintenance system 5 in accordance with the present invention which includes a system control computer 10; a plurality of remote data acquisition nodes 20-1, 20-2, . . . 20-5; and a communications path 25 for coupling the system control computer and the nodes. System control computer 10 and data acquisition nodes 20 are arranged as a LAN and network communication is compliant with the Arcnet protocol, for example. If data acquisition nodes are provided at more than one plant or facility, the system may be arranged as a wide area network (WAN). System control computer 10 may be any PC-based computer having a minimum hardware configuration as follows: a 486DX 66 central processing unit (CPU); 8 MB of RAM; 30 MB of hard disk space; and a 640×480×256 display. Of course, while a PC-based computer is used in a current implementation, the present invention is not limited in this respect. System control computer 10 is connected to nodes 20 via a network controller card which is connected to an input/output (I/O) slot of the computer. Additional "loops" of nodes may be added to the network by adding additional network controller cards in other I/O slots of the system control computer. As shown in FIG. 1, nodes 20-1, 20-2, and 20-3 are connected in parallel to system control computer 10. Nodes 20-4 and 20-5 are connected in series to node 20-3. Data is acquired independently by each of the nodes and the speed of the data acquisition process is the speed of the data acquisition process of the slowest of the nodes 20 as will be described in detail below.

Figure 2:
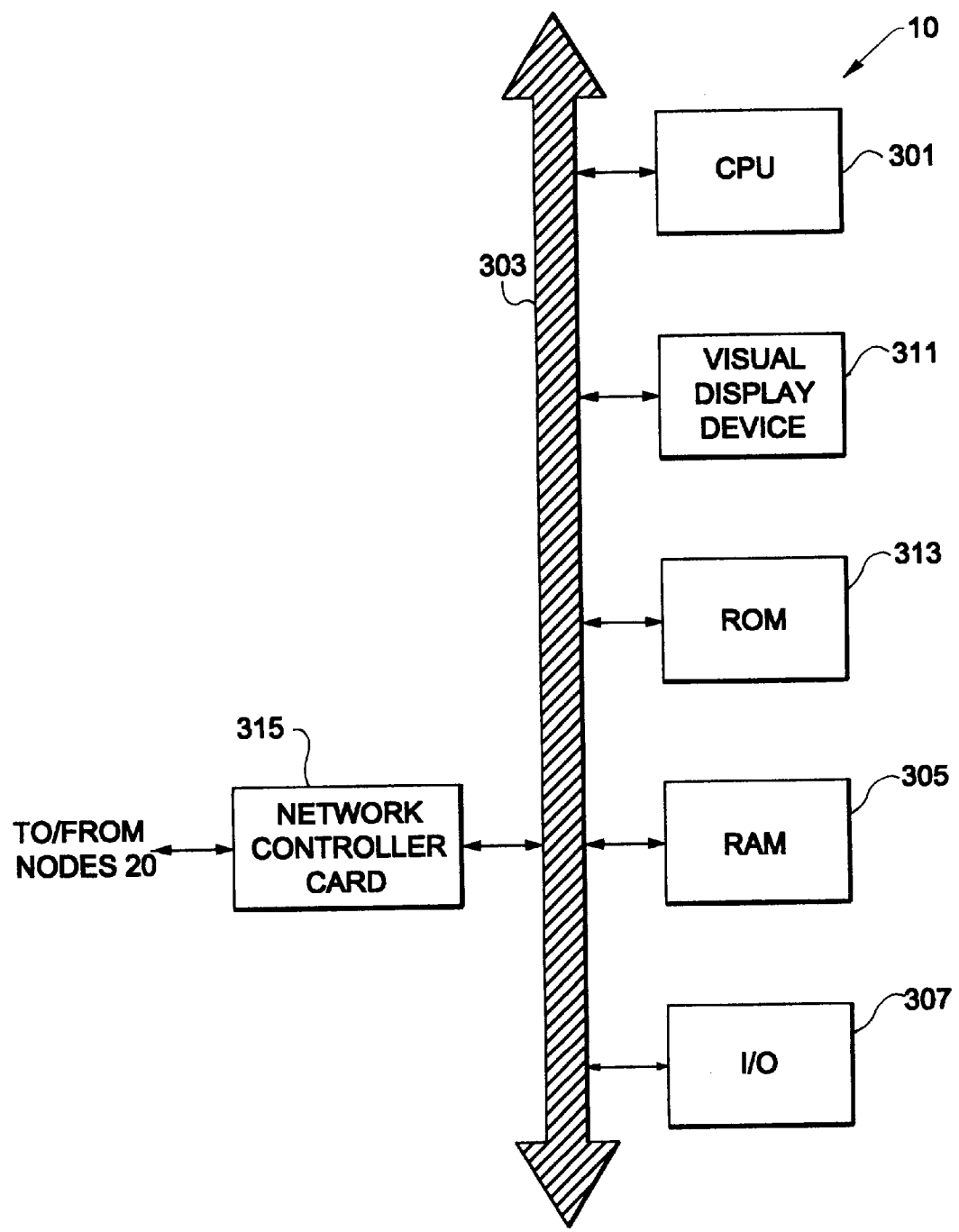
FIG. 2 is a generalized bock diagram of system control computer 10 of predictive maintenance system 5 of FIG. 1.

FIG. 2 is a generalized block diagram of system control computer 10. System control computer 10 may, for example, be an IBM®-PC compatible personal computer or any other computer which supports Windows and/or DOS environments and PC-compatible I/O cards. It should be understood that system control computer 10 is not limited to any particular type or brand of computer, and thus contemplates microcomputers to supercomputers. System control computer 10 includes a central processing unit (CPU) 301 such as an IBM® PC-compatible CPU which is plugged into bus 303. The system control program which will be described below is loaded into a memory (RAM) 305 during operation. Input/output is provided via an input/output (I/O) device 307. I/O device 307 can be any standard input/output device or devices such as a semiconductor memory, magnetic disk, magnetic tape, optical memory such as a CD-ROM, keyboard, mouse, touchpad, touchscreen, scanner, or any compatible or equivalent device. I/O is also provided by a network controller card 315 arranged in an I/O slot of system control computer 10. Network controller card 315 is connected to data acquisition nodes 20 via communications path 25. In order for a user to observe the results and navigate the interface to be described below, a visual display device 311 is used for an output device. Other output devices may include printers, speakers, magnetic or optical disks, tape, etc. A ROM 313 for storing the system BIOS, for example, is also provided. The program code for the system control program and the various data collected during data collection cycles may be stored on a magnetic disk generally identified as I/O device 307 in FIG. 2.

FIG. 3 is a block diagram of one of nodes 20 shown in FIG. 1. Such a node is available from Icon Research Ltd. (United Kingdom) and is described in Iconet *Dynamic Node Type I Operating Manual*, Issue 1.1. Node 20 includes 16 channel inputs, each input being supplied to an ICP interface 50 for powering a conventional two-wire transducer. Each channel is connectable to a vibration sensor which may be a Monitran 1100 Series or a Vibrametrics® 7000 series, for example. A multiplexer 52 selects one of the sixteen channels under software control. The output of multiplexer 52 is provided to a programmable gain amplifier 54 which selects gains under software control in steps of 1, 10, 100, and 1000. The output of programmable gain amplifier 54 is supplied to a programmable anti-alias filter 56 which removes high-frequency components from the analog signals supplied thereto which might alias back into the sampled signal. A bearing condition signal may also be supplied to anti-alias filter 56 via a conditioning circuit 58. An analog-to-digital (A/D) converter 60 converts the analog output of filter 56 to a digital signal. A/D converter 60 may, for example, sample up to 51.2 kHz and have a 14-bit resolution, thereby providing a theoretical dynamic range of 84 dB. A clock generation circuit 61 under the control of microprocessor 64 supplies clock signals to filter 56 and A/D converter 60 for varying the sampling rate. The sampling rate can also be synchronized to an external trigger EXT TRIG such as a once-per-revolution signal from a rotating shaft. A preprogrammed number of samples per revolution can thus be achieved. The external trigger also provides a tachometer function to determine shaft speed. A microprocessor subsystem 62 includes microprocessor 64, flash/EPROM 66, and SRAM 68. Microprocessor 64 controls the node under instructions stored in the EPROM or flash memory. After installation of the node, new applications can be loaded into the flash memory. SRAM 68 acts as a temporary storage area for buffering data before the data is transferred over the network. LAN controller 70 and LAN driver 72 control data transfer over the network. Microprocessor 64 controls the buffering of collected data until a polling command is received from system control computer 10 and also receives and processes the data collection configuration for the node over the network from system control computer 10. Watchdog circuit 74 monitors the status of incoming power voltages and the operation of microprocessor 64. If voltage variations may impact the correct operation of the node, watchdog circuit 74 ensures that microprocessor 64 is reset and is allowed to operate only when acceptable supply voltage has been restored. In addition, if microprocessor 64 is damaged, watchdog circuit 74 disconnects the node from the network. Power regulation circuit 76 ensures that correct voltages are generated for the components of the node. An RS 232 interface 78 provides a serial port for the node for providing communication to the node independent of the network. The node includes a network IN terminal which is connected to the highway cable that is terminated at system control computer 10. A network OUT terminal is connected to the next node in the highway or is terminated with a termination resistor.

Nodes 20 are distributed appropriately around the user's plant or facility. Specifically, all machine measurement points are identified and labeled, and measurement sensors are attached to the measurement points and to a channel on one of the nodes. The measurement points are determined by experience looking at measurement data quality. In general, a measurement point should be in a radial direction in as good a metal-to-metal contact as possible with the bearing housing of the particular machine. In addition, each measurement point should be as solid as possible. Once measurement points have been determined and vibration sensors (accelerometers) mounted thereto, each measurement point is noted for machine, machine location, and the channel to which the sensor has been connected on the node. Such information will be utilized in the construction of an interface that identifies the location of each sensor and gives the user access to the measurement points for configuration, data collection, data viewing, and data analysis as will be described below.

Interface and Interface Builder

The interface of the system control program of the present invention includes a series of graphical images whose surfaces are studded with buttons, bars, windows, and combinations of these features. As used herein, graphical images may include, but are not limited to, photographic images, drawings, and graphical images created using graphics software applications. By means of a mouse or other pointing device (e.g., a touchpad) or by means of a touchscreen, the user makes selections of plant locations and machines to be monitored, data displays and units, processes to be executed, and forward and backward progress through the system control program. This is referred to as navigation. The graphical interface manages not only the navigation, but also the storing, retrieval, and analysis of machine information for the system. The interface is constructed using graphical images obtained using digital cameras, scanners and/or software applications such as Microsoft® Paint, Photostyler or other CAD applications which permit the creation of graphical images. The interface uses these intuitive graphical images to help the user navigate through a complex plant or facility. The process of construction of the interface is performed entirely within the functionality of the system control program. The construction of the interface also creates and manages the data acquisition, storage, and analysis structure of the system.

The process flow for generating an exemplary, but non-limiting, interface is shown in FIG. 4(a). Graphical images are collected and stored in the memory (e.g., hard drive) of the system control computer 10 using digital cameras, scanners, and/or a graphics software application at ST 20. The user then customizes the interface to incorporate these graphical images into a hierarchy at ST 21 and adds measurement points to the graphical images which correspond to the physical channels on the remote data acquisition nodes 20 at ST 22. FIG. 4(b) is a schematic flow diagram of the generation of the graphical interface. Graphical images 200, 201, and 202 are stored in the memory (e.g., hard drive) of system control computer 10. The user first places "zoom" boxes or hyperlinks 204 and 205 on the graphical image 200. Zoom box 204 is linked to the graphical image 202 and zoom box 205 is linked to graphical image 201. The user adds measurement points 206 and 207 to the graphical images 201 and 202, respectively.

Figure 5A:
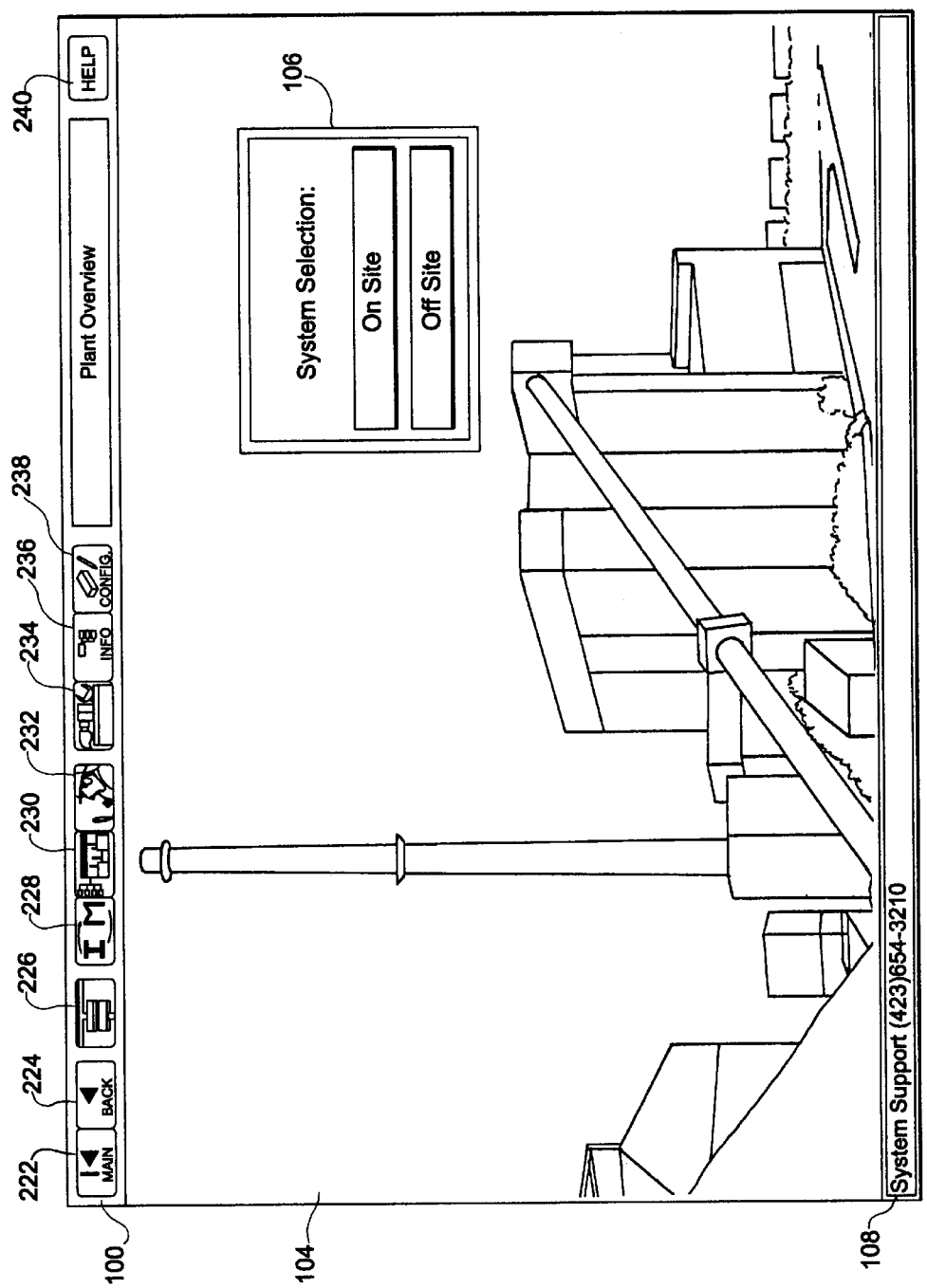
FIGS. 5(a)–5(n) illustrate the interface of the present invention.
Figure 5B:
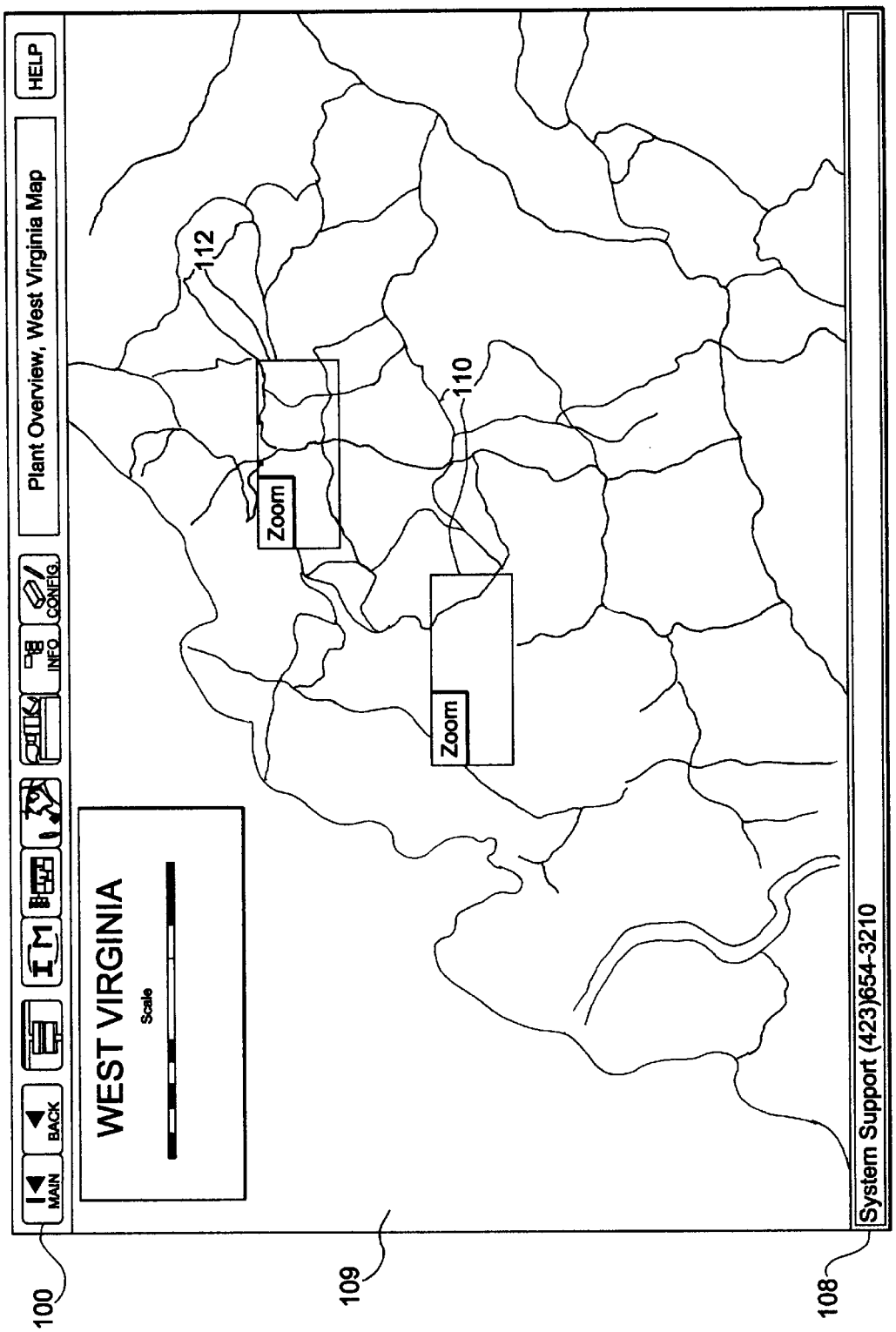

The graphical interface and its creation will now be described in greater detail. FIG. 5(a) illustrates the main system screen of an exemplary interface which includes a toolbar 100; a graphical image 104 of one of the plants monitored by the system control program; an "OnSite/OffSite" selection menu 106; and a status bar 108. The functions of toolbar 100 will be described in greater detail below. From this screen, the user can, for example, select either On Site or Off Site from selection menu 106. If "OffSite" is selected from the screen of FIG. 5(a), the user can select from one or more off-site facilities which are connected in the network via the screen of FIG. 5(b). FIG. 5(b) contains a graphical image 109 of the state of West Virginia and includes first and second zoom boxes 110 and 112 for permitting the user to select one of the plants or facilities in West Virginia controllable by the system control program of the present invention. For example, selection of zoom box 112 will result in the display of the plant shown in graphical image 114 of FIG. 5(c). It can be seen graphical image 114 of FIG. 5(c) includes zoom boxes 116 and 118 for permitting the user to "zoom" in still further on particular areas of this plant.

Figure 5C:
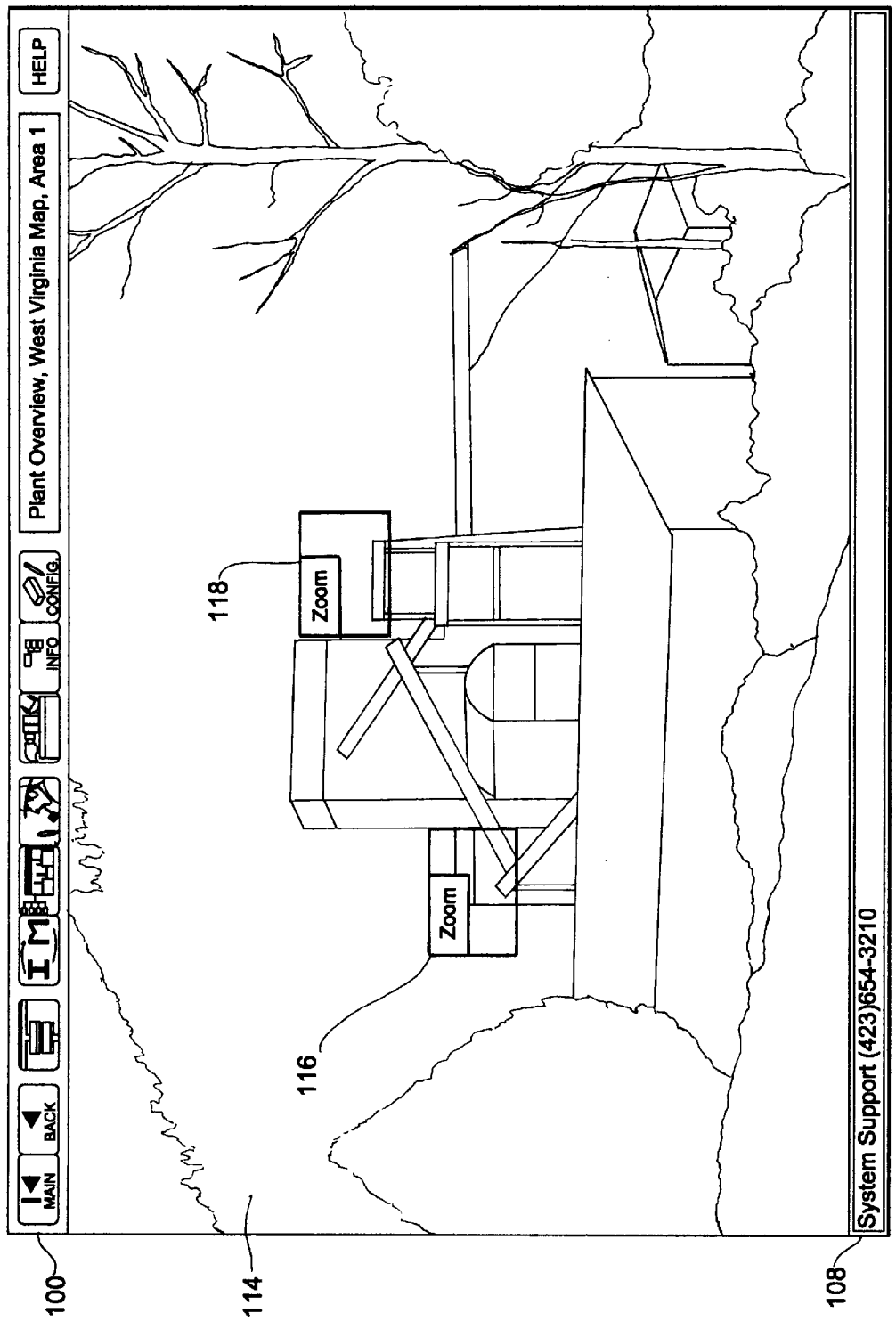
Figure 5D:
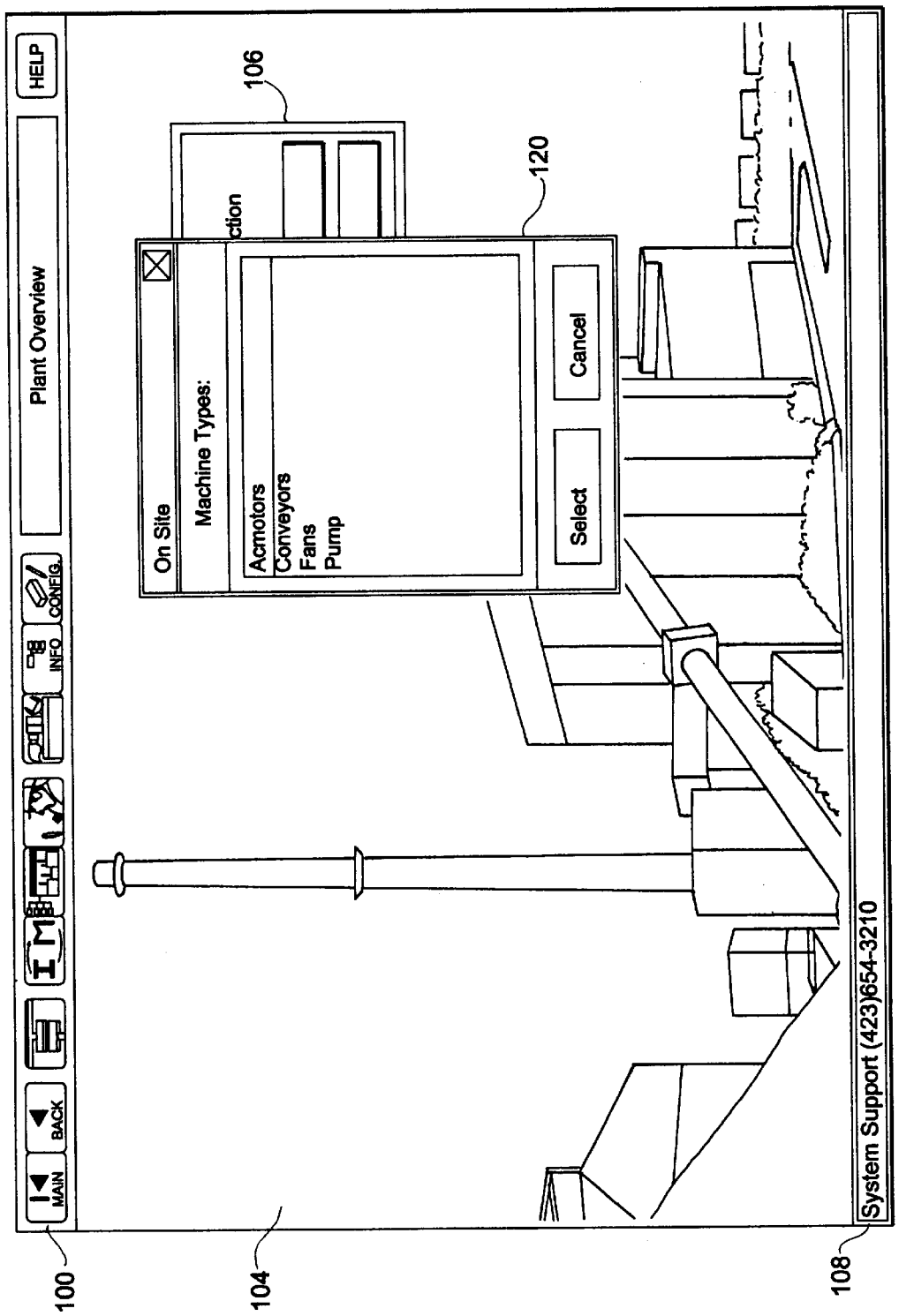
Figure 5E:
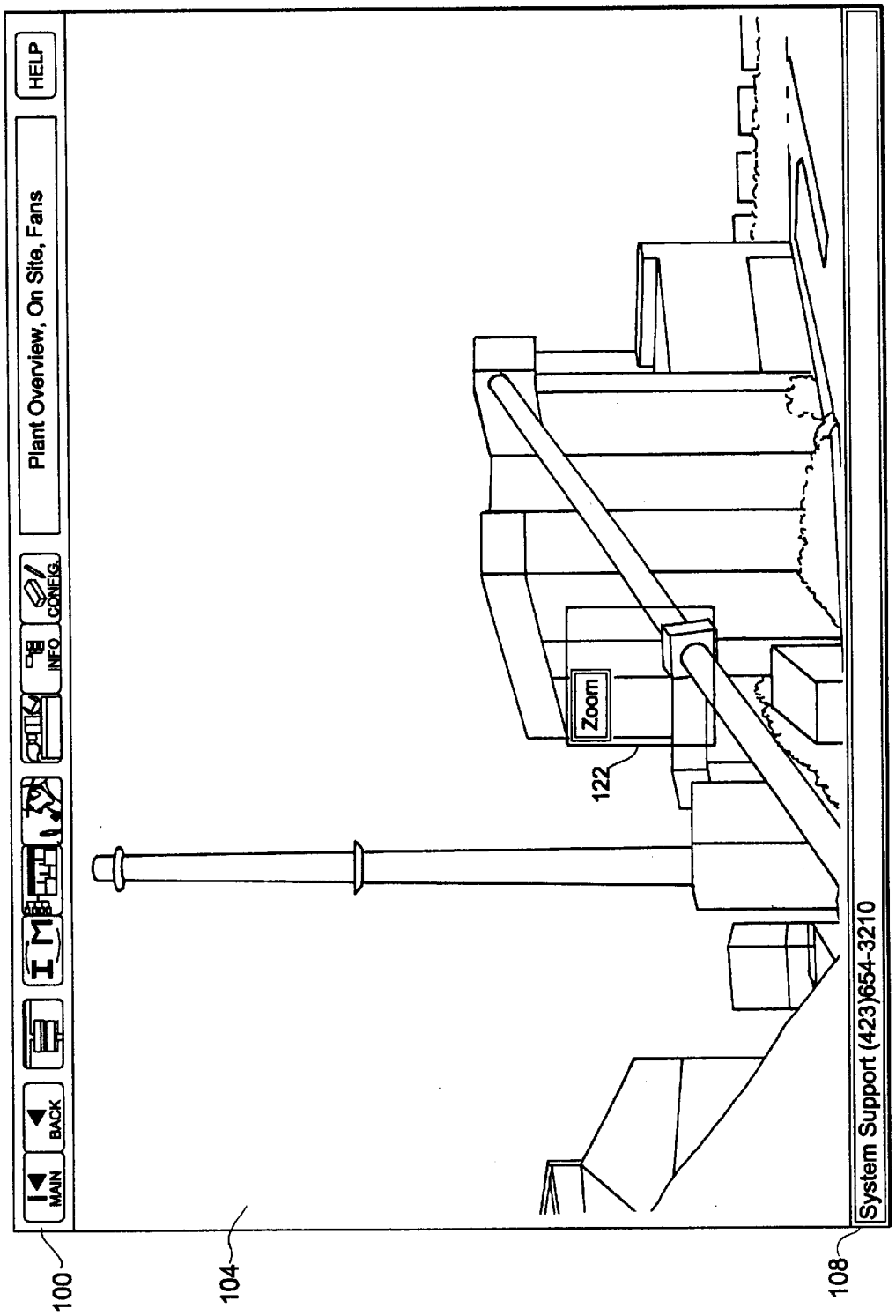

Retuning to FIG. 5(a), if "On-Site" is selected from the selection menu 106, a "Machine Types" selection or list box 120 of FIG. 5(d) appears on-screen and the user is able to select one of the machine types for the on-site facility, e.g., AC motors, conveyors, fans, or pumps. If the user, for example, selects "Pumps" from selection box 120, a zoom box 122 is superimposed on the graphical image of FIG. 5(a) to generally indicate the location of the pumps in the facility as shown in FIG. 5(e). Although only one zoom box is shown in FIG. 5(e), it will be appreciated that any number of zoom boxes may be provided in correspondence to the locations of the pumps at the facility shown in the graphical image 104. Similar zoom boxes are provided to indicate the locations of the other machine types monitored, i.e., AC motors, pumps, and conveyors. These other zoom boxes are accessible by making the appropriate selection from selection box 120 of FIG. 5(d). From the above description, it will be apparent that the user can use the zoom boxes to move to various parts of the plant or facility through the interface.

Figure 5F:
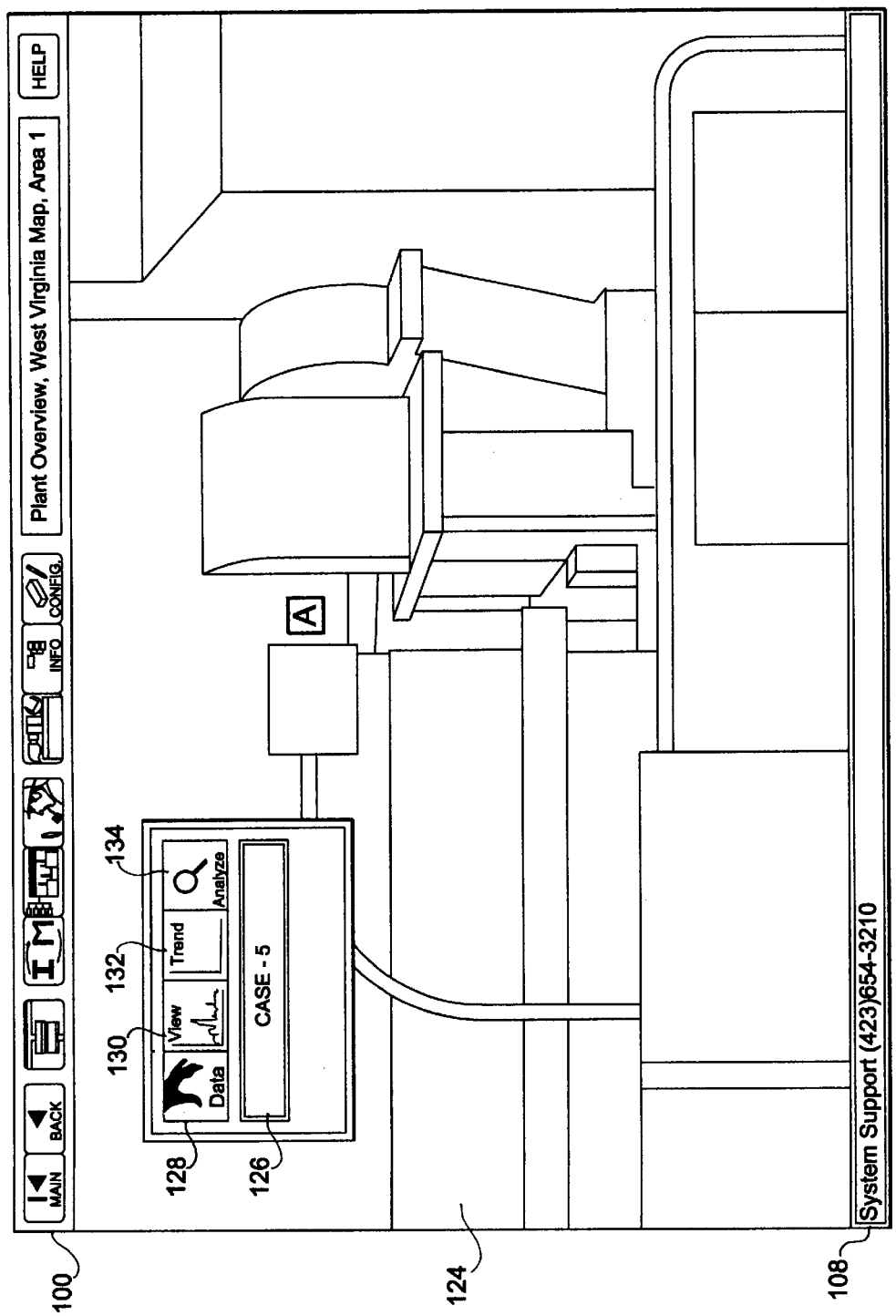
Figure 5G:
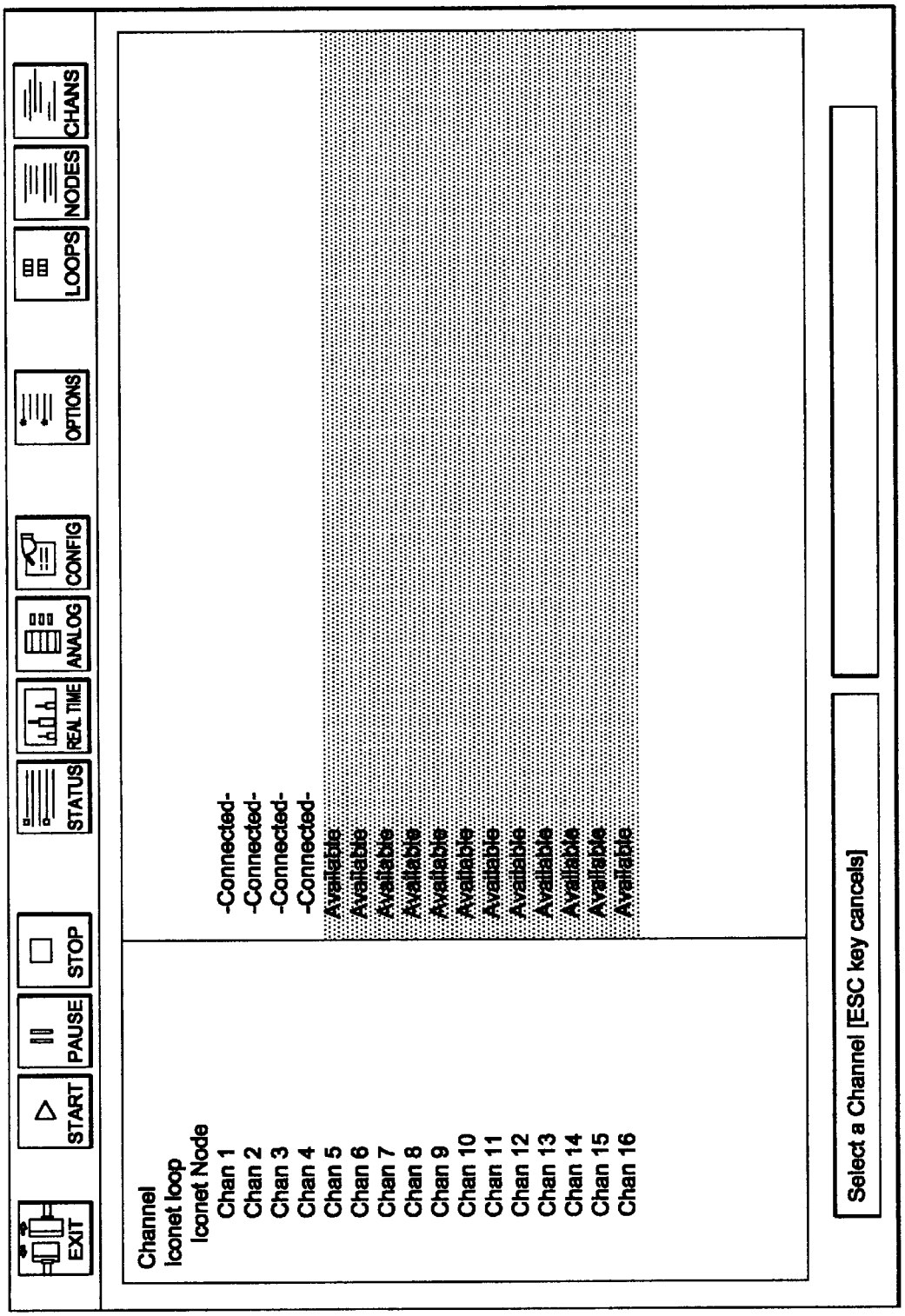
Figure 5H:
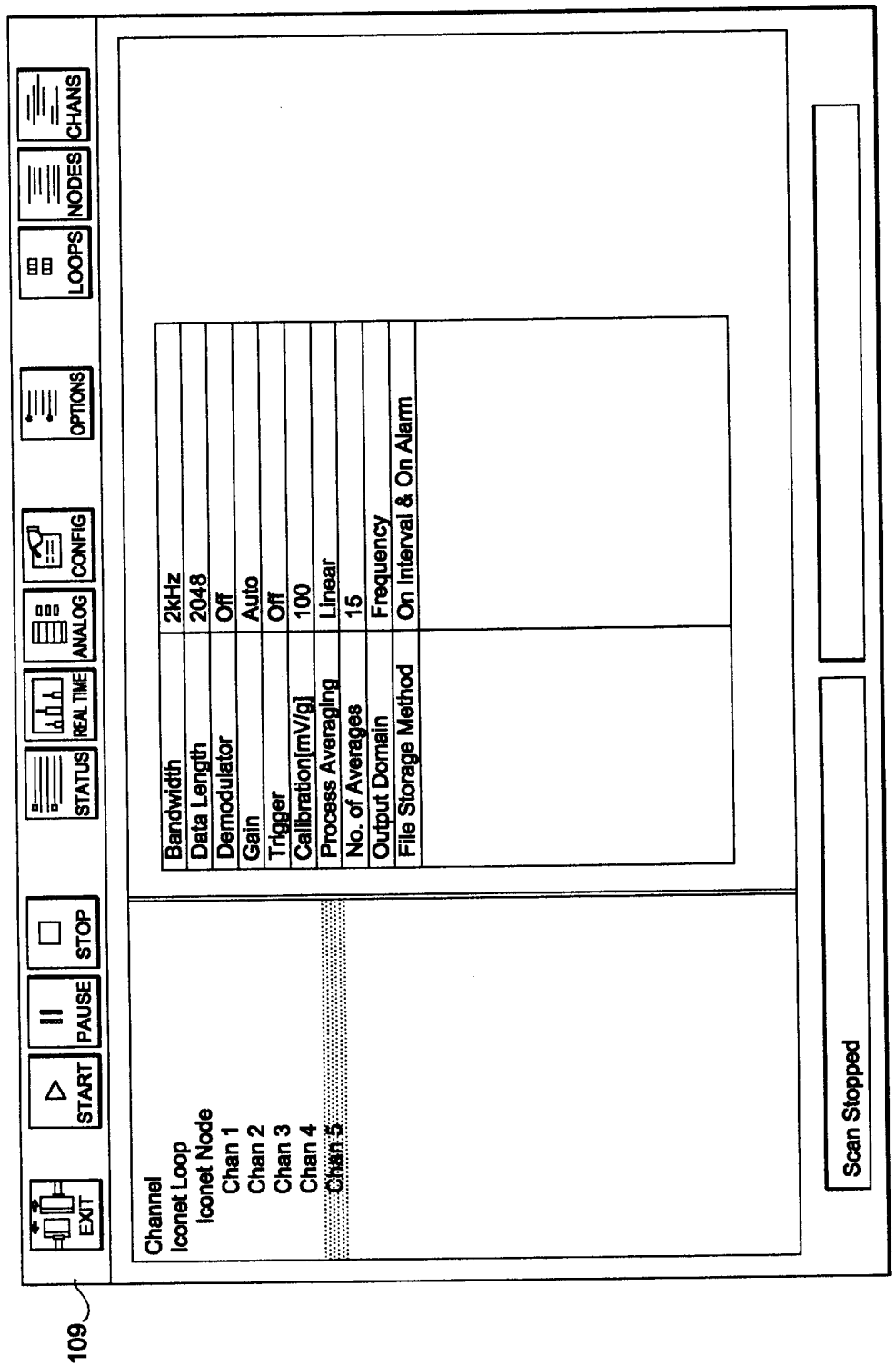

Clicking on zoom box 122 of FIG. 5(e) causes the screen of FIG. 5(f) to appear. The screen of FIG. 5(f) includes a graphical image 124 which "zooms in" on the plant location corresponding to zoom box 122 of FIG. 5(e) and includes measurement point "A" and a control panel 126 superimposed on graphical image 124. At any point in the interface where a measurement point such as point "A" is visible, control panel 126 will appear. Control panel 126 provides access to the main system functions of collecting, viewing, trending, and analyzing data and thus includes a "Collect Data" button 128, a "View Data" button 130, a "Trend Data" button 132, and an "Analyze Data" button 134. For example, selecting the "Collect Data" button 128 and then clicking on measurement point "A" will initiate a process for collecting data from measurement point "A" if that point has been connected to a channel of one of the nodes in the interface. If a measurement point has not been connected to a channel of one of the nodes, the user is given a prompt to this effect and is then presented with the screen of FIG. 5(g). The channel numbers for a particular node are listed on the left side of the screen of FIG. 5(g) and the status of these listed channels is indicated on the right side of the screen. Any channel number which is available has the legend "AVAILABLE" in the associated status line and any channel which is connected has the legend "CONNECTED" in the associated status line. A vibration sensor is connected by selecting the channel associated with that measurement location. For example, using the information regarding where each sensor is physically installed, suppose the user in this case connects the measurement point to channel 5. Once this channel has been assigned, the user may then input data collection configuration parameters for the channel via the data collection parameters screen of FIG. 5(h). The data collection configuration parameters may include, but are not limited to, frequency range of data collection, channel gain, and resolution.

Figure 5I:
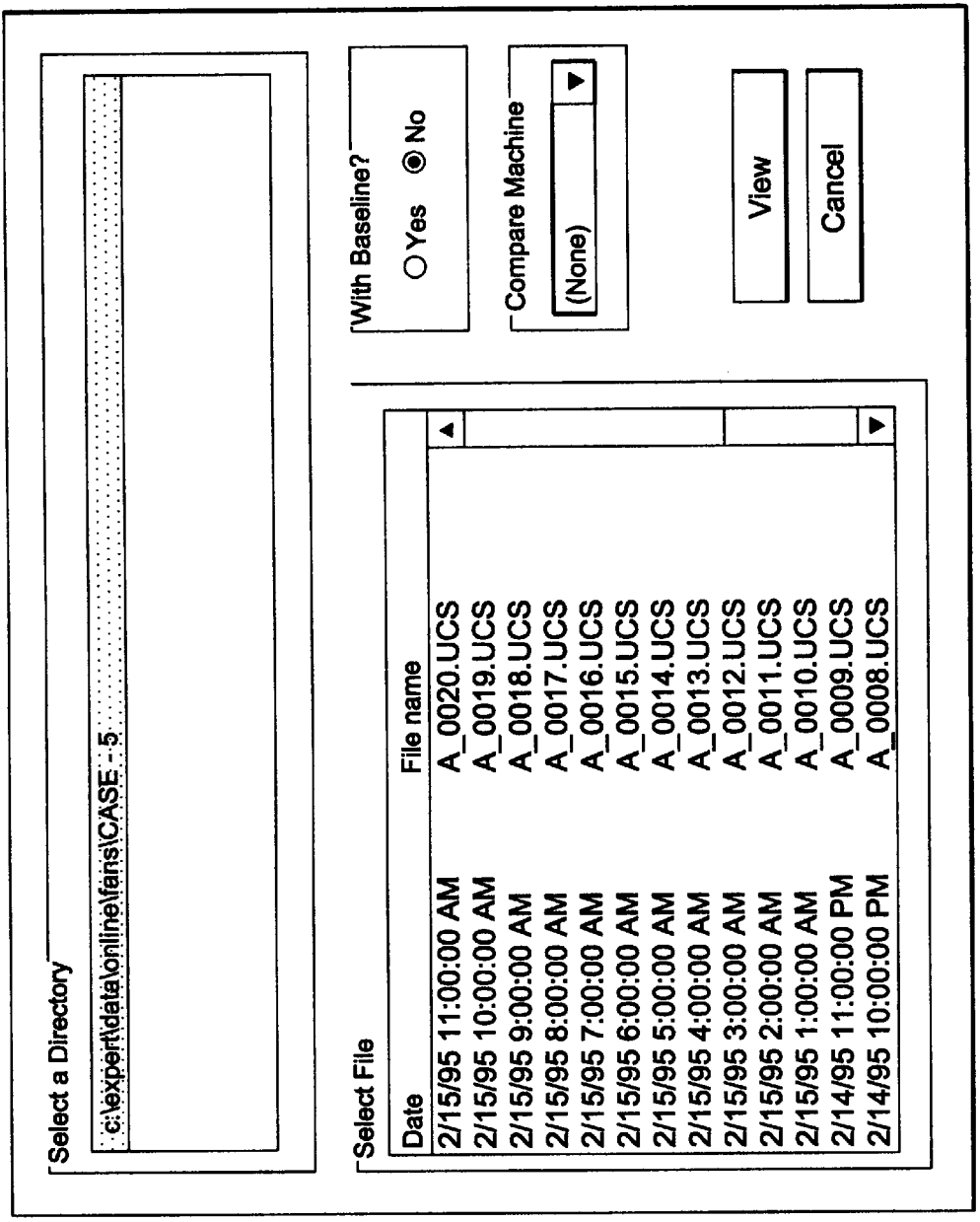
Figure 5J:
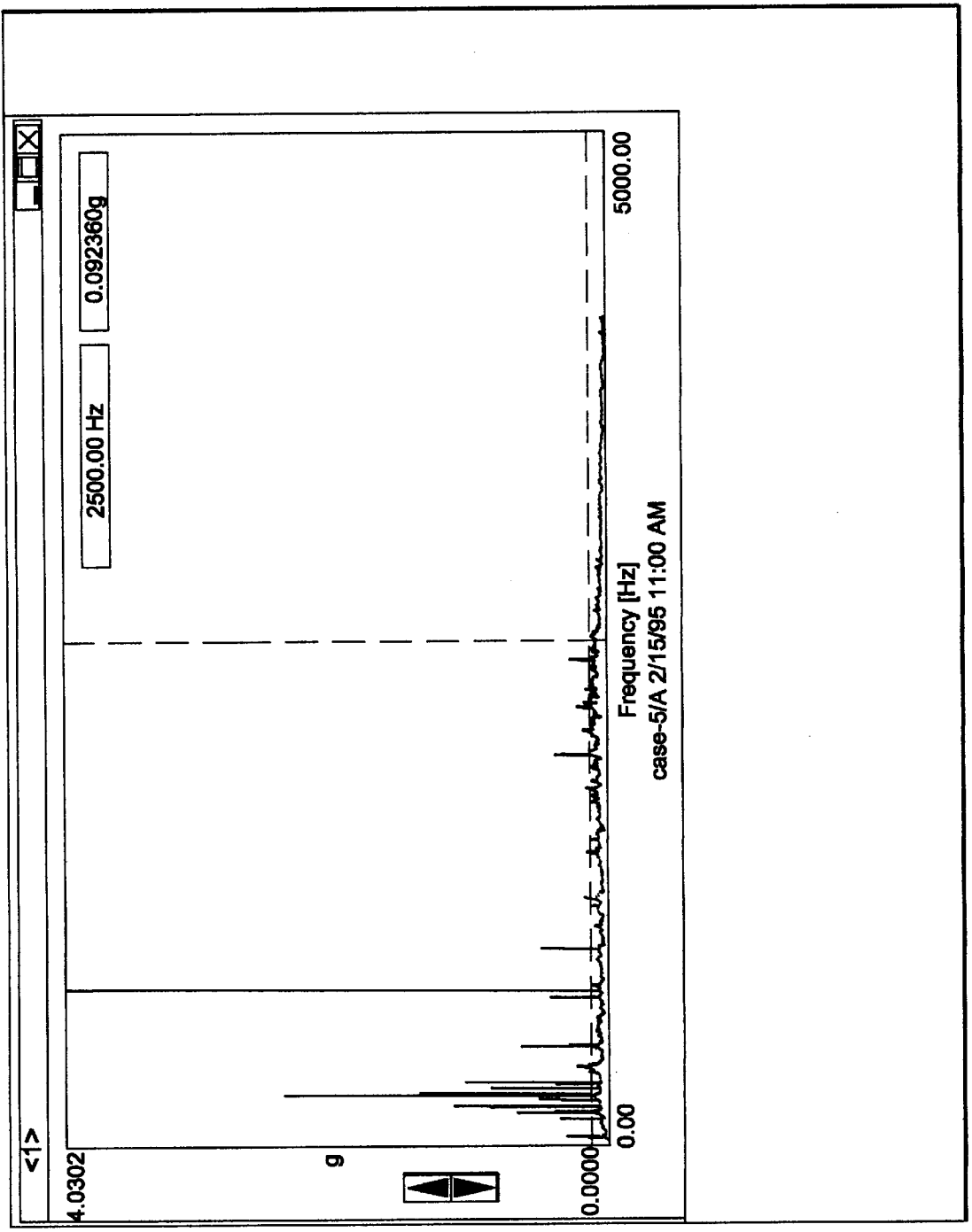

Returning to FIG. 5(f), selecting "View Data" button 130 and then clicking on measurement point A initiates a process by which data associated with that measurement point can be viewed by the user. Specifically, taking these steps causes the screen of FIG. 5(i) to be displayed. The screen of FIG. 5(i) prompts the user to select a data file for viewing from the vibration data files which have been previously collected for measurement point "A". These data files may be viewed with reference to baseline data, if desired. After selecting a data file, the user may click on the "View" button of FIG. 5(i) to generate a display of acceleration (in g's) versus frequency such as the display of FIG. 5(j).

Figure 5K:
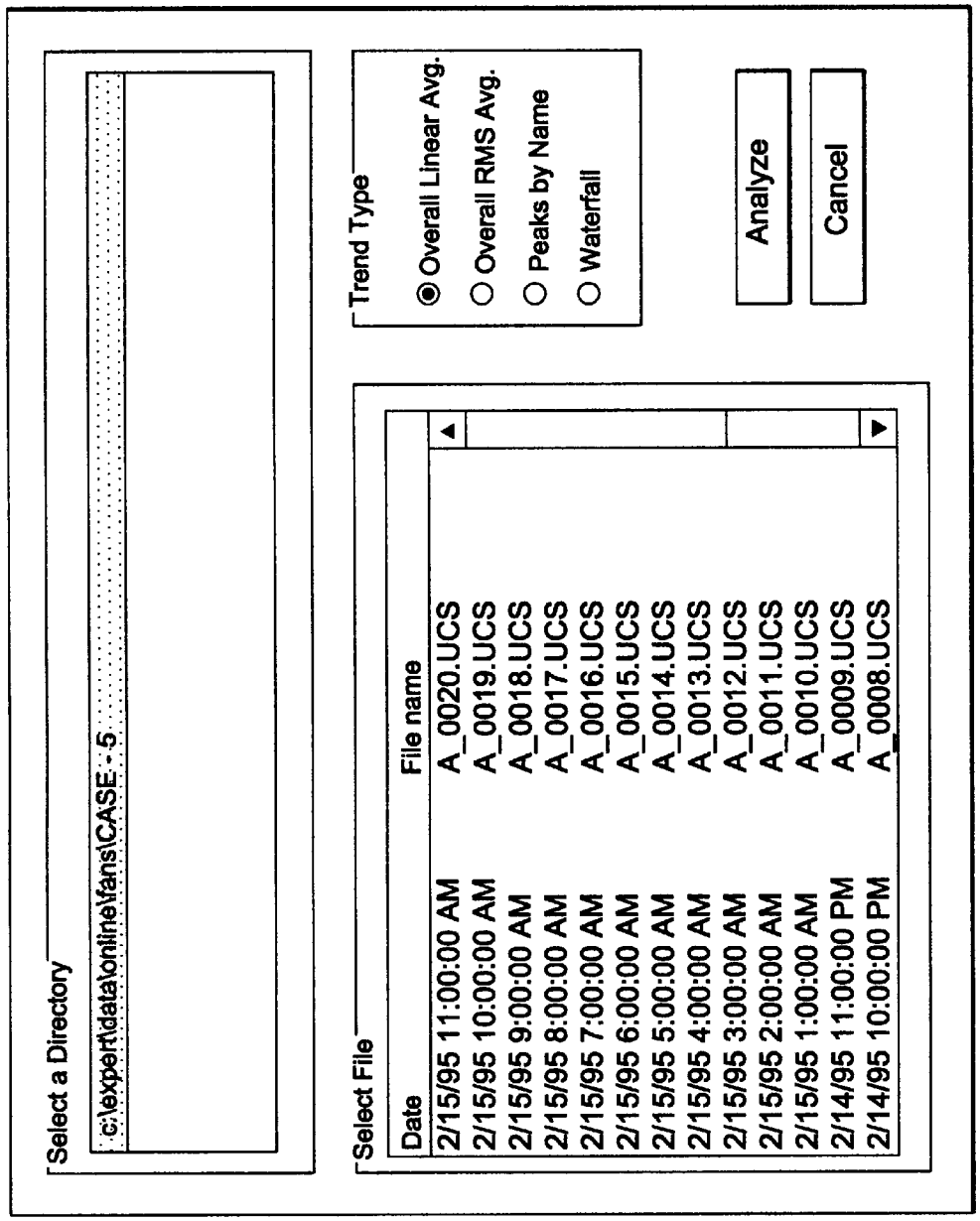
Figure 5L:
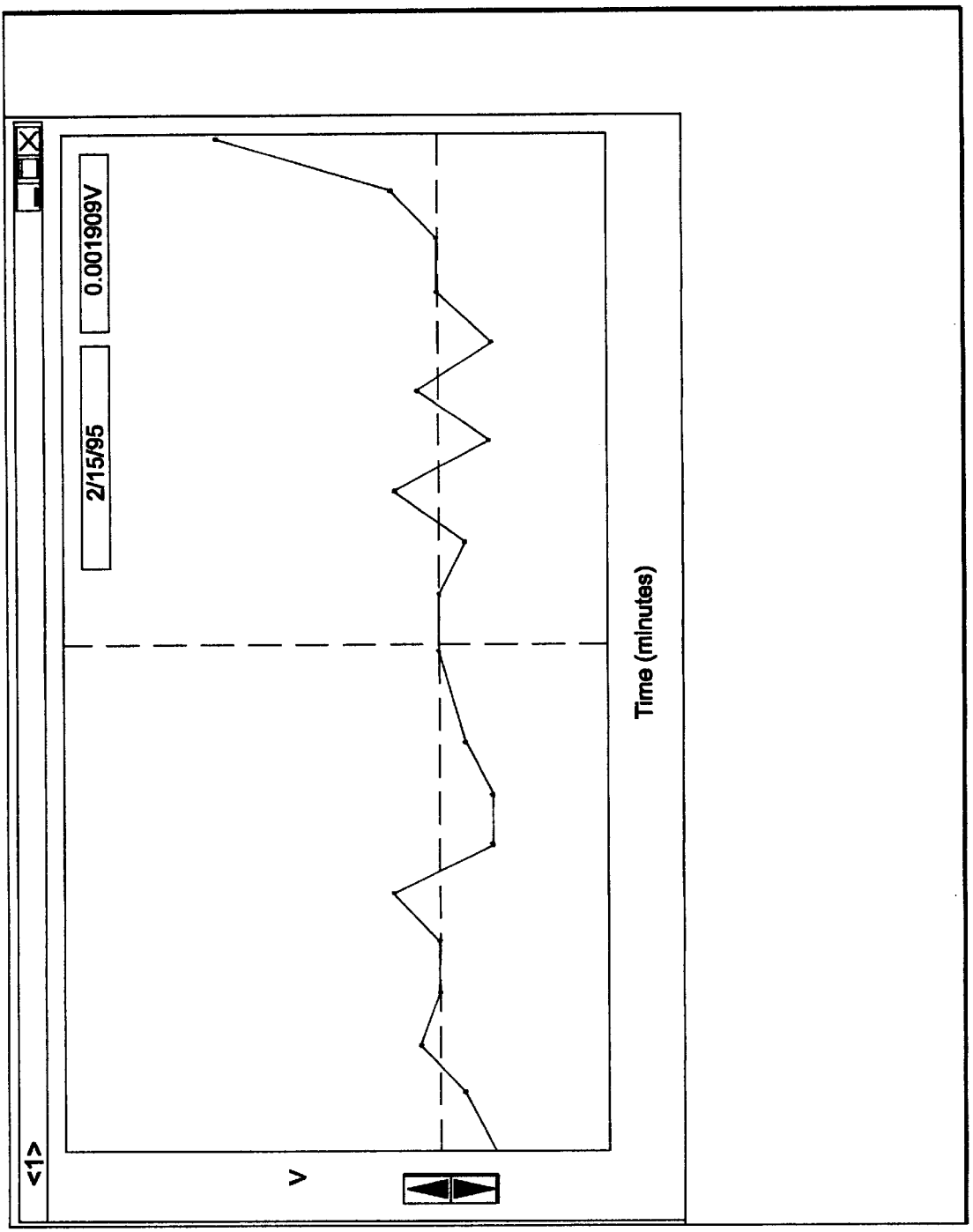

Selecting "Trend Data" button 132 and then clicking on measurement point A initiates a process for trending the data associated with the measurement point. Specifically, taking these steps causes the screen of FIG. 5(k) to be displayed. Trending allows the user to represent changes in a machine against time. Trend plots can display overall linear averages, overall RMS averages, averages of a particular peak and three-dimensional waterfall plots. Since trending is based on changes in data over time, the user must select some minimum number of data files (e.g., 3) in order for the trending to be carried out. Selecting all of the data files in FIG. 5(k) and clicking on the "Trend" button of FIG. 5(k) causes the trend plot of FIG. 5(l) to be displayed.

Figure 5M:
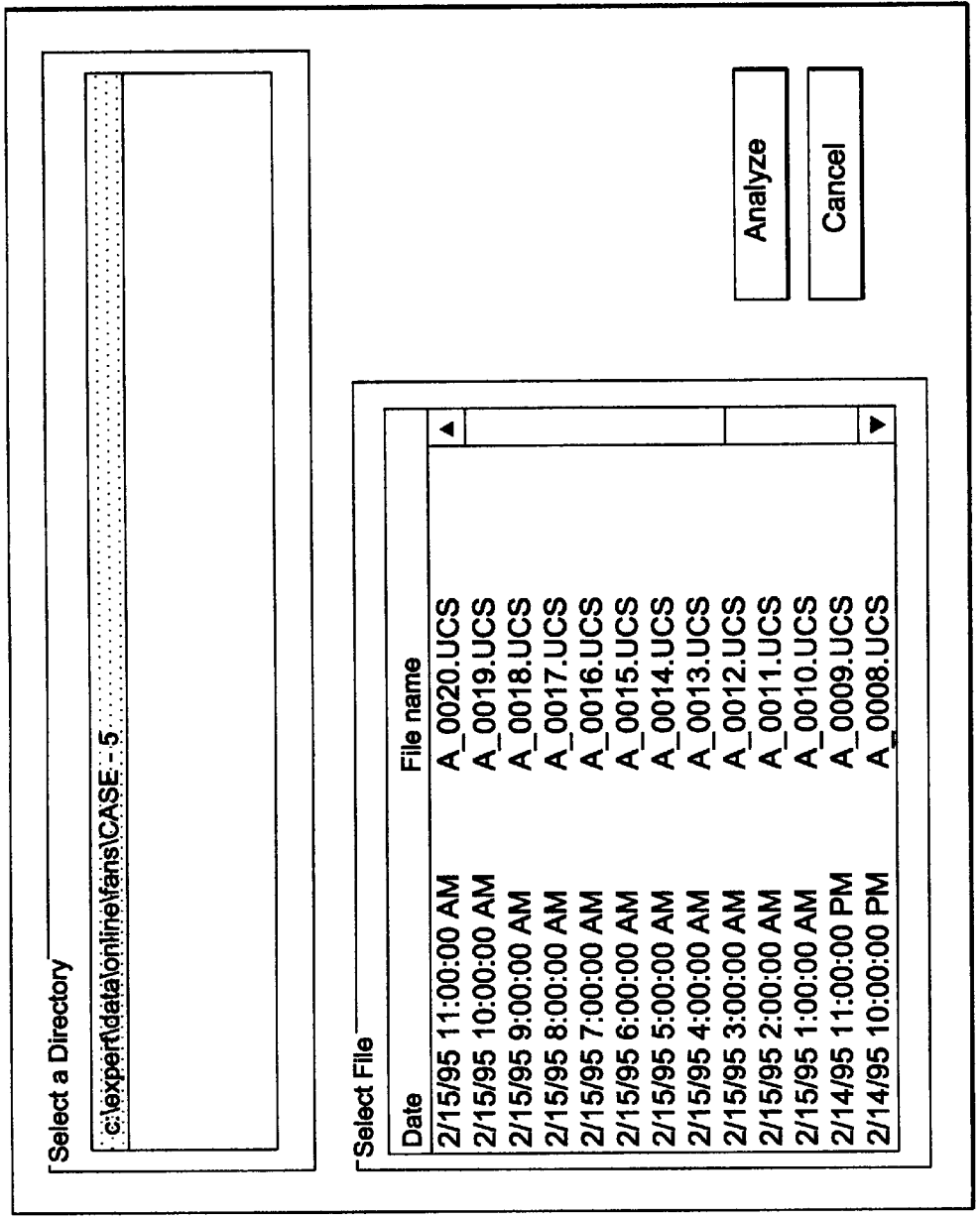

Selecting "Analyze Data" button 134 and then clicking on measurement point A causes the system control program to analyze data which has been collected from the measurement point. Specifically, taking these actions causes the screen of FIG. 5(m) to be displayed. This screen prompts the user to select a data file for analysis. After the user selects a data file and clicks on the "Analyze" button of FIG. 5(m), an "Analysis Results" screen like the screen of FIG. 5(n) is generated. The background of the results screens may be color coded to indicate the severity of any problems which are identified by the data analysis. For example, a green background may indicate normal operation; a yellow background may indicate a developing problem; and red may indicate an urgent problem for which immediate attention is required. The text of the screen of FIG. 5(n) provides the user with an identification of possible causes of the potential failures which have been identified. It can be seen that the user may also examine the symptoms of the problems as well as recommended actions for remedying the problem.

It can thus be seen that the interface of the present invention provides an intuitive and simple way for users (even unskilled users) to navigate through a plant or facility and identify machine problems which have developed or are developing.

Figure 6A:
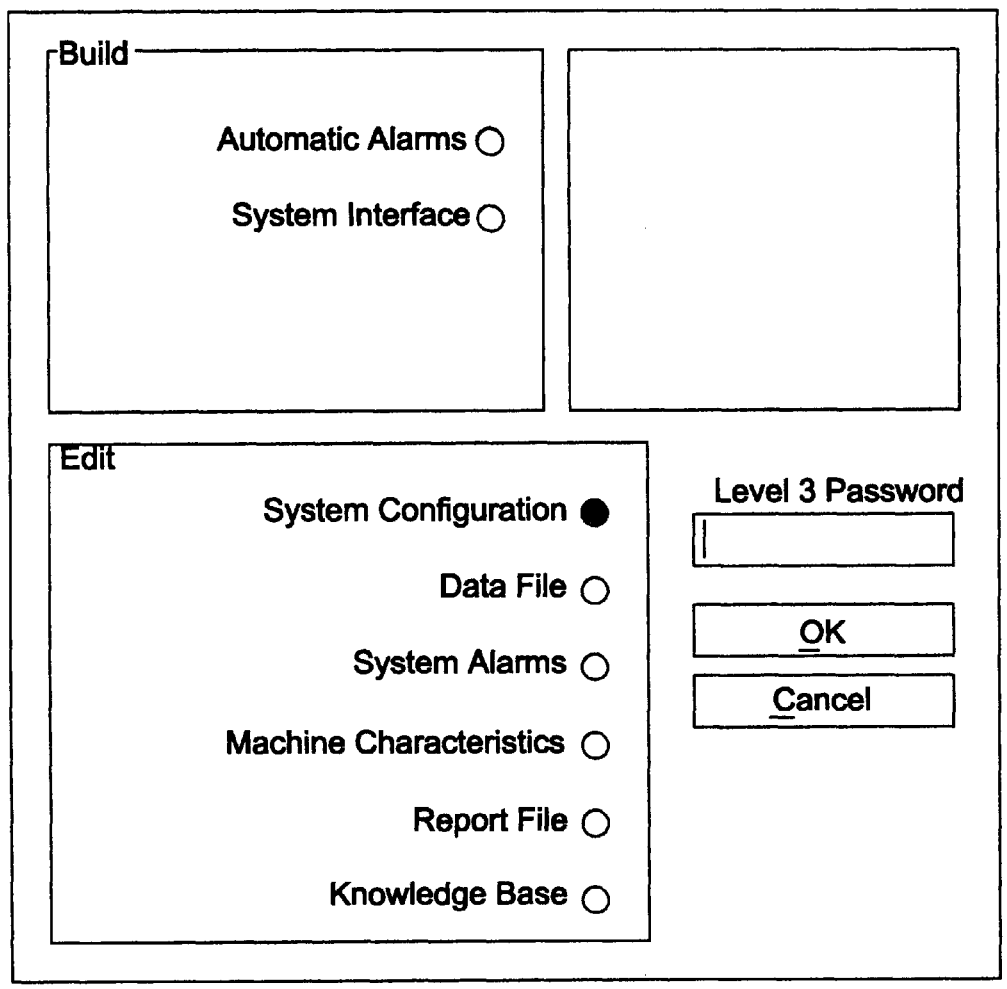
FIGS. 6(a)–6(d) illustrate the tools for building the interface of FIG. 5.

The above-described interface may be built by selecting the "Config" button 238 from the main tool bar 100 of FIG. 5(a). This causes the System Design/Configuration form of FIG. 6(a) to be displayed. The user then selects the System Interface option, optionally enters an appropriate password, and selects OK. This results in the interface builder toolbar 150 of FIG. 6(b) appearing on top of the current position in the interface. Toolbar 150 remains on top of the interface and may be moved by dragging the title bar 152. Toolbar 150 includes a bitmap change "CHG" button 152; a measurement point "ADD" button 154; a zoom box "ADD" button 156; a "Move" button 158; a "Size" button 160; a delete "Del" button 162; and a "Main Menu Design" button 164.

Figure 6B:
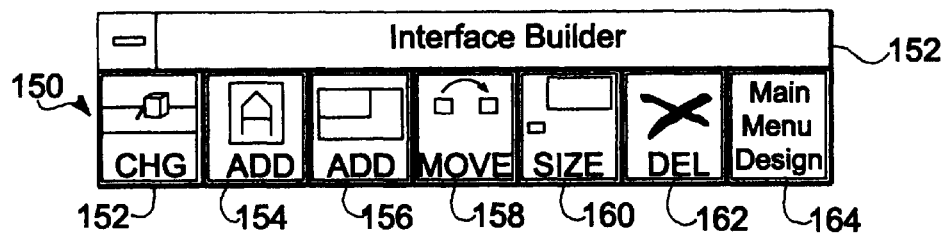
Figure 6C:
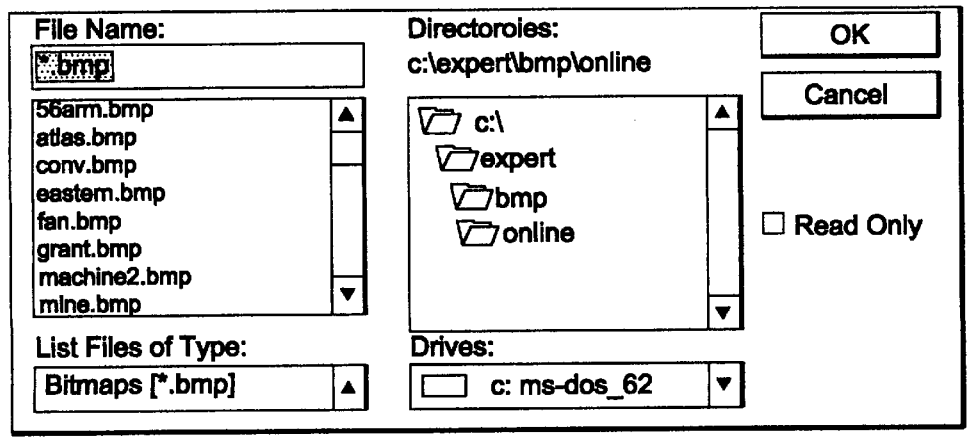

Selecting the Bitmap Change button "CHG" 152 from toolbar 150 of FIG. 6(b) allows the user to change the current background graphical image by selecting a graphical image (in this case a bitmap file) from a dialog screen such as the screen shown in FIG. 6(c). As noted above, the graphical images can be created using a digital camera, a scanner for scanning images into a computer, and/or a graphics software application. The created images may be stored on the hard drive of system control computer 10.

Figure 6D:
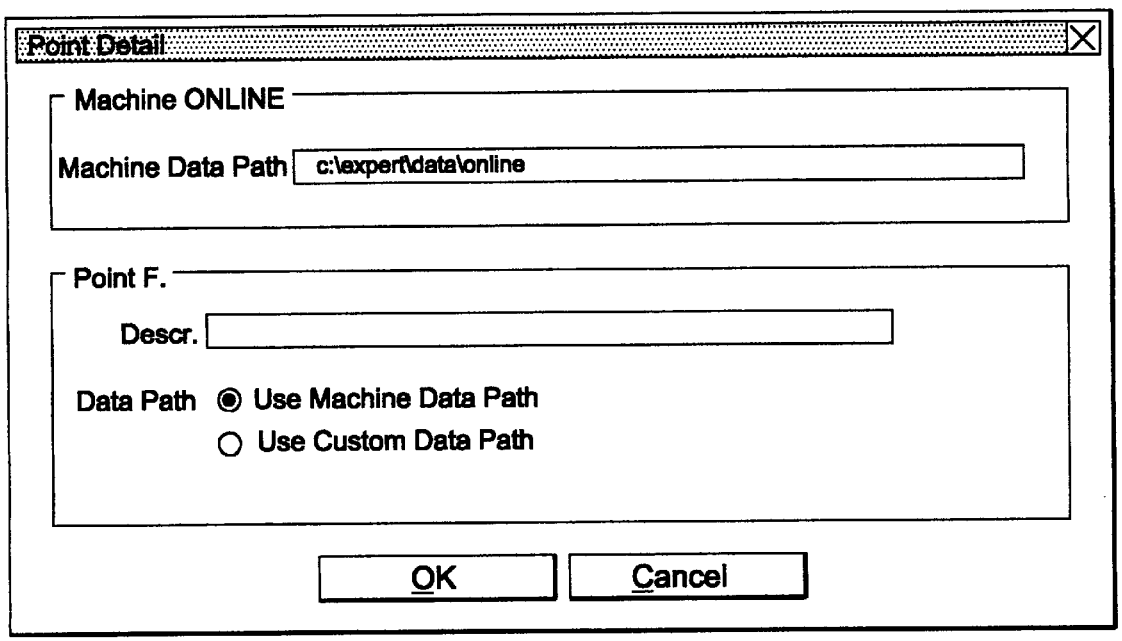

Having selected a graphical image, the user may then add measurements points to the graphical image using "ADD" button 154 on toolbar 150 of FIG. 6(b). As noted above, these measurement points will be selectable by the user for collecting, viewing, trending, and analyzing data. When "ADD" button 154 is selected, another measurement point will be placed to the right of the last measurement point added. The user may use the "Move" button 158 to move the measurement point on the selected graphical image. When a measurement point is added to the graphical image, the user is prompted to enter an optional description and data path for the new measurement point via the screen of FIG. 6(d). The data path is either a custom or a default location for the storage of the data files for the data to be collected at that measurement point.

Having selected a graphical image, the user may also add zoom boxes to the graphical image using "ADD" button 156 on toolbar 150 of FIG. 6(b). As noted above, these zoom boxes are used to zoom to another screen in order to provide more detail or to link to other plants or plant areas. The other screen may itself contain additional zoom boxes and/or data measurement points as described above. If zoom boxes already exist on the current graphical image, a new zoom box will appear at a fixed position (e.g., to the right) relative to the last one added. If no zoom boxes exist on the current screen, the first one will appear at a predetermined position (e.g., the top left corner) of the screen. Once a zoom box is added and moved, selecting it will present a blank screen ready for the selection of a graphical image using "CHG" button 152 on interface builder toolbar 150 and the addition of other zoom boxes and/or measurement points using the "ADD" buttons 154 and 156 of interface builder toolbar 150. The system of the present invention provides for any level of linking and thus a user may add any depth of zooms.

Selecting the "Move" button 158 from toolbar 150 of FIG. 6(b) allows the user to move existing measurement point location buttons, zoom boxes, and control boxes and selecting the "Size" button 160 from toolbar 150 of FIG. 6(b) allows the user to size existing zoom boxes. Selecting the "Delete" button 162 from toolbar 150 of FIG. 6(b) deletes measurement point location buttons and zoom buttons from the existing interface.

During the interface building process described above, the system control program automatically makes modifications to the *INI file that is launched with the system control program. A text editor such as Microsoft® Notepad may be used to view this file and make any further modifications that may be necessary to complete the customization of the system. Viewing and modifying the *INI file directly also represents another method for building the interface and is described in greater detail in Appendix I.

Data Acquisition, Collection, and Analysis

The first step in the data collection procedure is to connect the vibration sensors to a location in the interface. This step can be performed from the interface by, for example, zooming through the interface to the machine and to the measurement point in question and, with "Collect Data" button 128 of control panel 126 and "Configure" button 238 of toolbar 100 selected, clicking on the measurement point. If that measurement point has not yet been connected, a warning is generated and the user can cause the System Status screen of FIG. 5(g) to be displayed. The System Status screen includes two columns of information. The first column is titled "Channel" and within this column is a list of loops, nodes, and channels. Loop 1, Node 1 is the default and 1 to 16 sensor locations are available for connection. The second column is titled "Status" and shows the status of each channel. Channels that have been connected previously will be greyed out and are thus unavailable for connection to a new sensor without being disconnected first. To connect a sensor, the user selects a non-greyed channel on the node using the information regarding where each sensor is installed. The system then displays the configuration window of FIG. 5(h) so that the user can configure the data collection configuration parameters.

After configuring each channel's data collection parameters and collecting a first set of data, the next step is to configure the system control program by displaying the first set of data and establishing baselines for each measurement location. The baselines are used to determine the "normal" operation of the machine at that particular measurement point such that the system control program can identify changes in normal operation. Once the baselines are created, order sheets need to be generated. These order sheets provide the system control program with the basic design parameters necessary to identify frequency components in the data and to identify the severity of a change. The diagnosis of the system control program is based on "order sheets" and "knowledge bases". The knowledge bases are generic to all types of machines and require no machine-specific information. However, the order sheets are very specific and are generated from information such as numbers of teeth on gears; bearing reference numbers; and shaft speeds. In general, an order sheet contains the frequency of machine characteristics, the band within which the system looks for a peak, and thresholds pertaining to the severity of the peak (e.g., high, too high). The system control program of the present invention includes an order sheet building facility that simplifies the creation of order sheets and reduces the possibility of the entry of incorrect information, which could cause the system's analysis to be incorrect. This order sheet utility is shown in FIG. 7. The system control program creates two files once the design information has been entered by the user. The first file is a master file which is the master order sheet having a listing of frequencies identified by name. The second file is the system order sheet which contains not only characteristics named, but also the frequency range in which system control program looks for those characteristics and the thresholds pertaining to "high" and "too-high" operation. When the system control program runs, these files are used to identify problems with the machine. The system control program may create order sheets automatically by comparing the list of frequencies generated by the data supplied by the user and the baselines for that measurement point.

Once the order sheets are established for each measurement point, the analysis routines of the system control program can be utilized. When the system is completely configured, the user may set parameters for controlling the data collection cycle. These parameters may be set using a data input form such as the form of FIG. 8. One of the data collection cycle parameters is the minimum cycle time to acquire data. The system control program automatically calculates the minimum polling rate for the system based on the data collection configuration parameters that are used for the slowest node along with the number of measurement points or channels configured for that node. For example, a node with one connected channel will (in general) have a faster data acquisition interval than a node with two or more connected channels and the speed of the connected channels will be dependent on the configuration of the channel including, for example, the frequency range selected and the resolution. Thus, the polling speed is equal to the speed of the slowest node, which speed is determined by two factors: the number of channels connected and the configuration for the channels. This automatically calculated minimum time is suggested by the system control program as a default as shown in FIG. 8 and will be used by the system control program if the user does not override that value. The data collection cycle parameters also include a file storage interval which is the rate at which the system stores data files and which is generally set to a time longer than the scan interval in order to save disk space. The automatically calculated scan interval is suggested by the system control program as a default for the file storage interval. However, as noted above, to save disk space, a user will likely override this default value and select a longer interval. In general, the cycle time must be sufficient to catch machine failures based on a knowledge of that machine's failure modes. For normal predictive maintenance over a long period of time, this interval should be longer than one minute and for most machines be as long as one hour.

On the right side of the form of FIG. 8, the user may check/uncheck a "Perform Analysis" option. If order sheets exist, "Perform Analysis" is available. This means the system control program will both collect and analyze data within the cycle time. If order sheets are unavailable and this option is checked, the user will be prompted appropriately. The analysis does not delay the automatically calculated minimum system cycle time—it is included within the cycle time display on the left side of the form. The form also permits a user to set file storage options including the file storage depth. The depth corresponds to the number of data files back in history for any moment in time for each and every measurement point that the system stores (i.e., a depth of 10 means that any moment in time, the system will have 10 vibration signatures available for display prior to the moment data is required for viewing). For example, if the data depth is set at 1440, then the system will be able to store data every one minute for a 24 hour period without overwriting the oldest of those files. Therefore, the system will maintain a window 24 hours long prior to a system alarm such that trending over a 24-hour period is available up to the point of failure. When the desired data collection parameters have been set, a data collection cycle may be executed.

FIG. 9(a) is a logic and flow diagram of the configuration of remote data acquisition nodes 20 and the data collection and analysis cycle. At ST 1, remote data acquisition nodes 20 are configured in a synchronous manner on the LAN. After the nodes 20 are connected in the LAN and sensors are connected to the nodes, data acquisition begins for each node 20 at ST 2. The data acquisition for each node is continuous and independent of the other nodes connected in the network. A polling cycle is determined by calculating the longest acquisition interval of any of the remote nodes 20 at ST 3. As noted above, the acquisition interval of a node is determined by the number of connected channels and the configuration of the channels. Thus, nodes with more connected channels generally will have longer data acquisition intervals than nodes with fewer connected channels. Also, when the A/D sampling is performed, the rate of the sampling is determined by the frequency range over which the data is collected. User selection of a frequency range thus sets the rate of the A/D clock. The higher the frequency range selected, the faster the clock is running and the faster the data acquisition time. As a further example, the higher the user selected resolution, the slower the data acquisition time since more data is required. Thus, for example, a node having channels configured for low resolution and high frequency has a shorter data acquisition time than a node having channels configured for high resolution and low frequency. The system control program uses such information to determine the node having the longest data acquisition interval.

The data collection process of the system control computer then pauses for the slowest device to acquire data at ST 4. The length of the pause is equal to the data acquisition interval for the slowest node. At the end of this pause, the system control computer polls each node in series and data is collected one node at a time via the LAN at ST 5. A complete analysis is then performed of the collected data and an analysis report is provided to the user at ST 6. Control then returns to ST 4 where the process again pauses for the slowest node 20 to acquire data and steps ST 5 and ST 6 are repeated.

Figure 10:
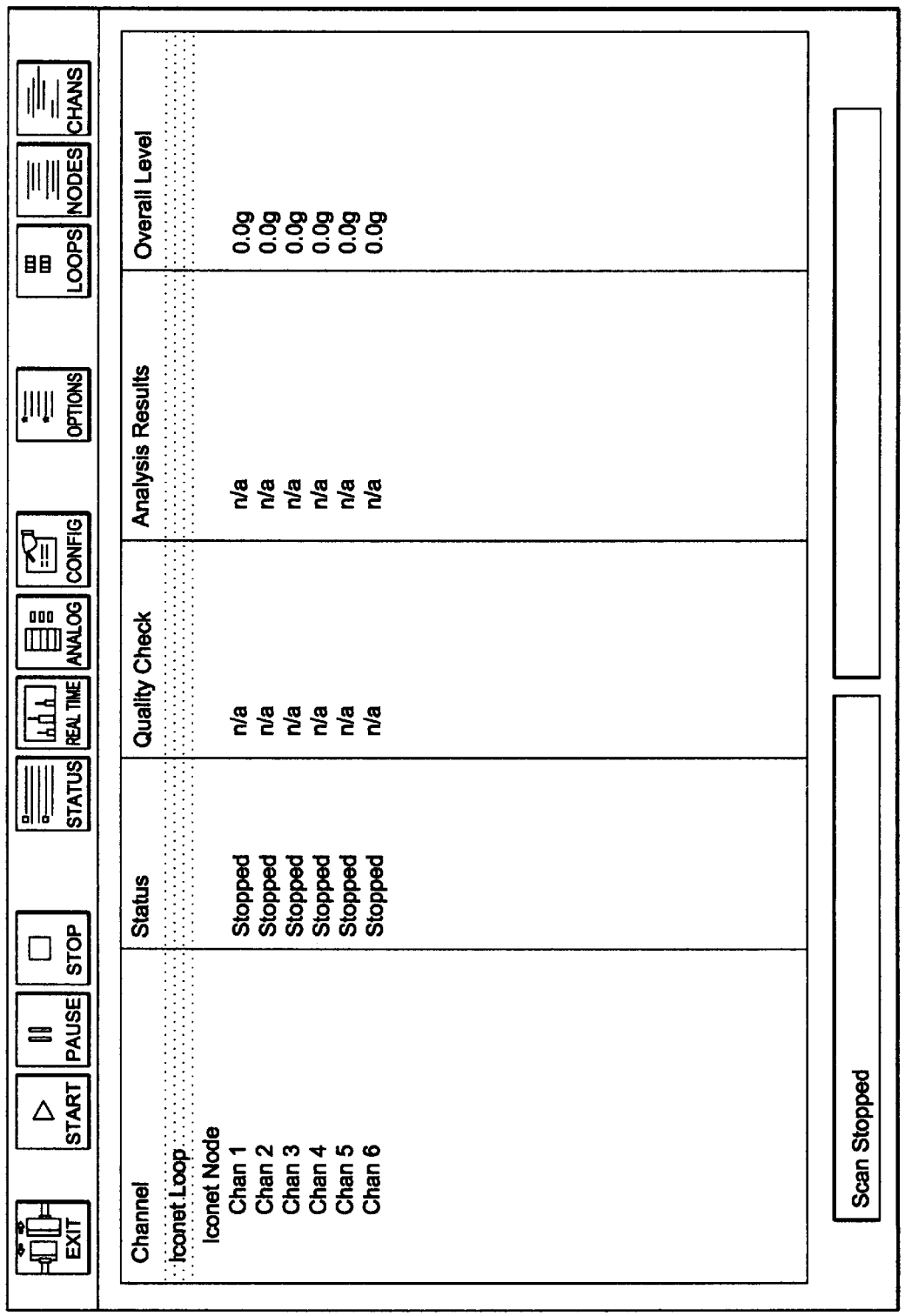
FIG. 10 illustrates a system status screen.

Part of the analysis process of the present invention is to perform a data quality assessment and to return conclusions of both the data quality and data analysis process. The details of the analysis of ST 6 of FIG. 9(*a*) are shown in FIG. 9(*b*). At ST 10, a quality check is performed on collected data by comparison with the baselines, and noisy regions, excessive line noise, and very low levels of data are identified. Next, peaks in the data are identified and signal-to-noise ratios are evaluated at ST 11. The peaks are then correlated with known machine characteristics in the order sheets at ST 12. Peaks which exceed characteristic amplitude levels in the order sheets are flagged at ST 13. The flagged peaks are then categorized as to the amount of noise surrounding them at ST 14 to determine significance, i.e., to determine the relative size of the peak. Other specific conditions are then evaluated to determine whether any of the flagged peaks should be eliminated at ST 15, e.g., by comparing a peak amplitude with the region surrounding it and ensuring that its amplitude is at least 20% higher than the average amplitude within that region. The remaining flagged conditions are then processed in accordance with the machine knowledge base at ST 16 and output is generated for the user at ST 17 as shown in FIG. 10.

Once a cycle has been designed and started, it will run indefinitely. A system status screen such as the screen of FIG. 10 gives an overview of the system's performance—loops, nodes, channels, etc.—corresponding to the specific highway layout. If left at the highest level, a loop will be color coded with the severity of the fault found on that particular loop. For example, green may indicate nothing to report and no corrective action is required at this time; yellow may indicate a developing problem; and red may indicate an urgent problem for which immediate attention is required. If that loop is selected, a list of nodes on the loop will be displayed and again a color coding will indicate the severity and the appearance of a fault on a particular node. The selection of that node will then display all of that node's channels again identifying a fault down to the channel location. Once at the channel location, the user can check the configuration of that point, generate a real-time data display, and perform a current analysis.

Thus, in accordance with the present invention, an expert system interprets the machine data as it is collected and conclusions are presented to the user based on the application of a knowledge base in a real-time manner without affecting the data acquisition cycle time. Generally, the knowledge base is a series of causal relationships that define an outcome based on information in a data set and is developed based on knowledge of machine operations and failure. In one form, such a knowledge base may take the form rules. A rule consists of an IF part and a THEN part. The IF part lists a set of conditions in some logical combination. The piece of knowledge represented by the rule is relevant to the line of reason being developed if the IF part of the rule is satisfied; consequently, the THEN part can be concluded. An example of such a rule as applied to a fan might be "If vibrations at 2000 hertz are above 0.04 g's, then fan needs to be balanced." As noted above, such rules are developed based on a knowledge of machines and how and why they fail. Expert systems whose knowledge is represented in rule form are called rule-based systems. In addition, the system of the present invention possesses the ability to extend its knowledge base via self-learning. That is, the system of the present invention can add knowledge to its knowledge base based on the actual operation and failures of machines to which the system is connected. Using the above example, the system might add the rule "If vibrations at 2000 hertz are above 0.04 g's, then fan needs to be balanced" if it was determined that such a vibration condition was correctable by balancing the fan.

Figure 11A:
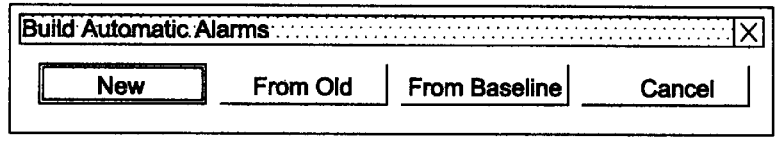
FIGS. 11(a)–11(c) are screens used in order sheet creation.
Figure 11B:
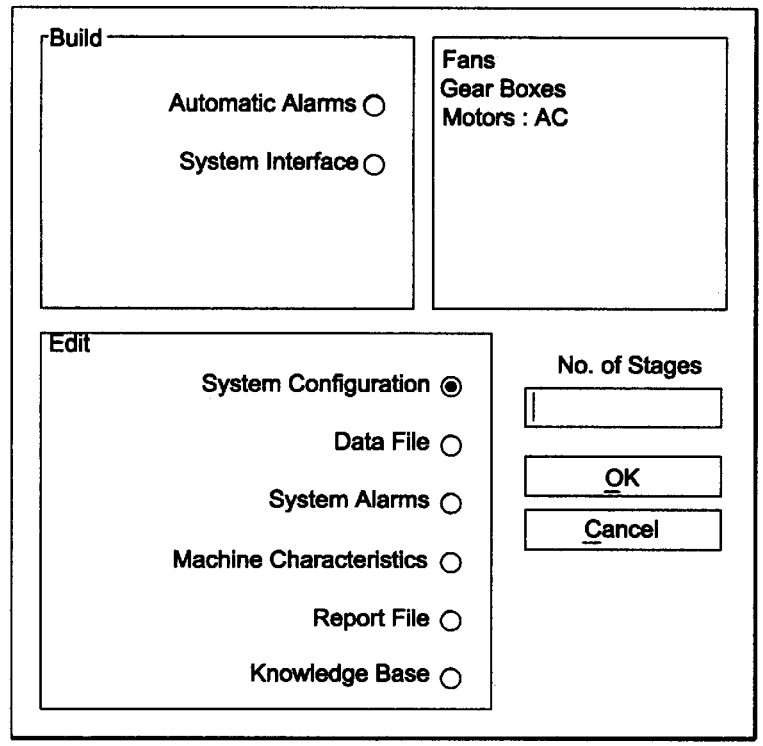
Figure 11C:
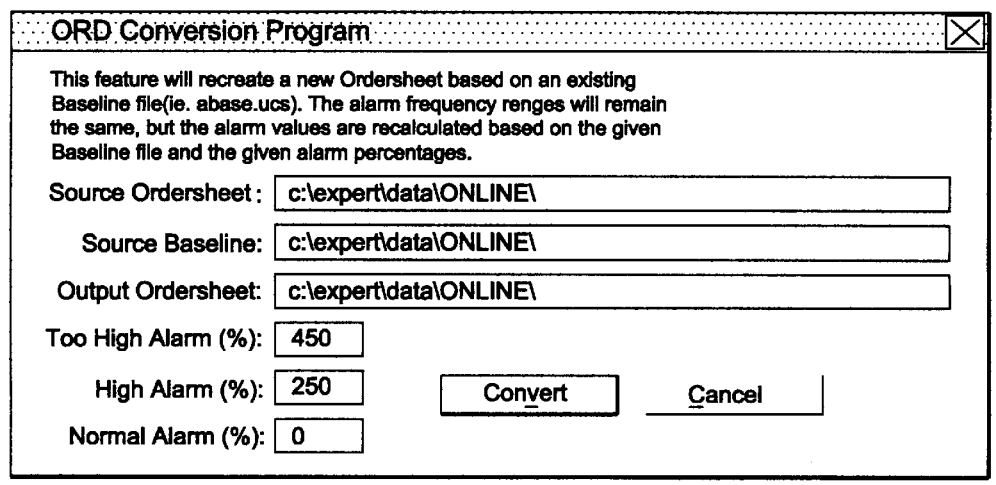

To build an order sheet, the user selects "Automatic Alarms" from the screen of FIG. 6(*a*) and enters an appropriate password (optional). The build "Automatic Alarms" function may be password protected to restrict access only to authorized personnel. The screen of FIG. 11(*a*) is then presented and provides the user with four options: "New", "From Old", "From Baseline", and "Cancer". If "New" is chosen, the screen of FIG. 6(*a*) is presented again to user with the box in the upper right hand corner filled in with the machines being monitored by the system control program as shown in FIG. 11(*b*). This machine list will vary from facility to facility. If the user chooses "Fans", enters the number of stages, and then selects OK, the "Build Automatic Alarm For . . ." screen of FIG. 7 appears. An order sheet is built by the user by filling appropriate information into the edit boxes. For example, the fan shaft rotational speed in hertz; the frequency range to sample (the user may choose from 25, 100, 200, 500, 1k, 2k, 5k, 10k, 20k, and 40k); the lines of resolution (the user may choose 100, 200, 400, 800, or 1600); the broadband frequencies (selecting a value in the frequency range to sample edit box automatically supplies values in the "High" column of this window); the number of blades; and the expected bearing defect frequencies (the entry of a bearing reference number will automatically provide this information if that bearing is in the data base). The user may save this worksheet as a DSN file or create an order sheet based on the information provided.

If "From Old" is selected from the screen of FIG. 11(*a*), a previously saved DSN file may be selected so that the user does not have to retype all the information into the form of FIG. 7. If "From Baseline" is selected from the screen of FIG. 11(*a*), the screen of FIG. 11(*c*) appears and the user enters a location into each line item. This feature allows for regenerating an ordersheet based on a baseline file that is different than the original baseline used during the automatic creation of an order sheet. All alarm frequency bands will remain the same; only the amplitudes of the alarm tolerances will change to reflect the amplitudes in the baseline file which the user provides. The user may then select convert to create the regenerated ordersheet. If "Cancel" is selected, the user will be returned to the System Design/Configuration menu of FIG. 6(*a*).

FIG. 5(*g*) shows a toolbar 190 used for the collection of data in the on-line mode. The following is a list of the toolbar buttons and their corresponding functions:

EXIT: This button exits out of the on-line scan mode and returns the user back to the main screen. If "Password Required" has been selected in the options screen, a prompt will appear for initials and password to exit the on-line scan mode.
START: This button starts a scan.
PAUSE: This button pauses a scan.
STOP: This button stops a scan.
STATUS: This button causes the display of a system status screen such as the screen of FIG. 10. This button is equivalent to selecting "View" and then "System Status" from the menu bar.
REAL TIME: This button causes the display of a real time status screen for a selected channel. This button is equivalent to selecting "View" and then "Real Time Status" from the menu bar.
ANAL LOG: This button causes display of an analysis log status screen for a given channel. This button is equivalent to selecting "View" and then "Analysis Log Status" from the menu bar.
CONFIG: This button causes the display of a configure a point screen. This button is equivalent to selecting "View" and then "Configure a Point" from the menu bar.
OPTIONS: This button launches an on-line scan options screen such as the screen of FIG. 8.
LOOPS: This button causes a display of the loops in use and limits the display of FIG. 10 to the loops level.
NODES: This button causes a display of the nodes in use and limits the display of FIG. 10 to the node level.
CHANS: This button causes a display of the channels in use like the screen of FIG. 10.

Main Toolbar Functions

The functions of toolbar 100 shown in FIG. 5(a) will now be described. "Main" button 222 and the "Back" button 224 are for navigating backwards through the interface. "Main" button 222 returns the user immediately back to the main screen of FIG. 5(a). "Back" button 224 takes the user back one screen at a time, effectively "unzooming" each screen. By visually transporting the user from screen to screen using zoom buttons and "Back" button 224, the interface can be made to represent any plant, facility, or process. Thus, the user can navigate through his/her plant or facility just as if walking around in it.

"On-line Scan" button 226 launches the on-line scan mode described above.

Figure 12A:
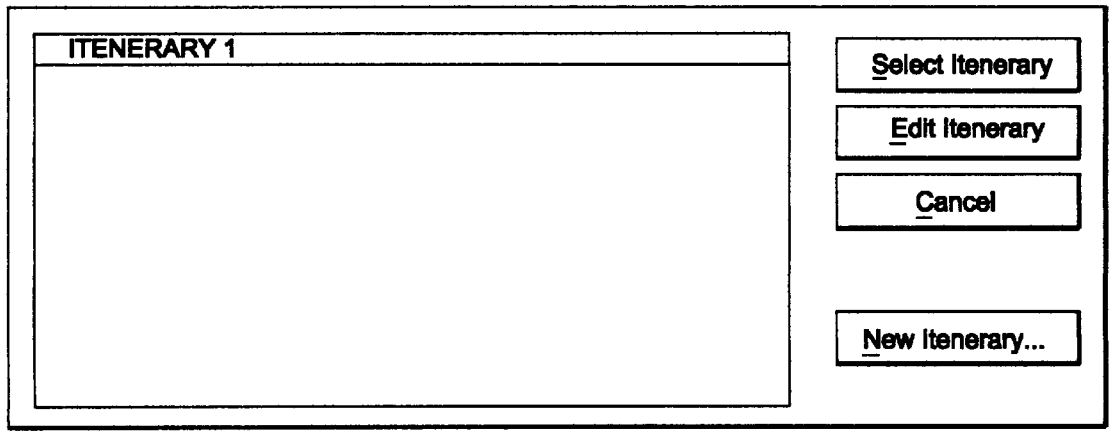
FIGS. 12(a) and 12(b) are screens used in the itinerary manager utility.
Figure 12B:
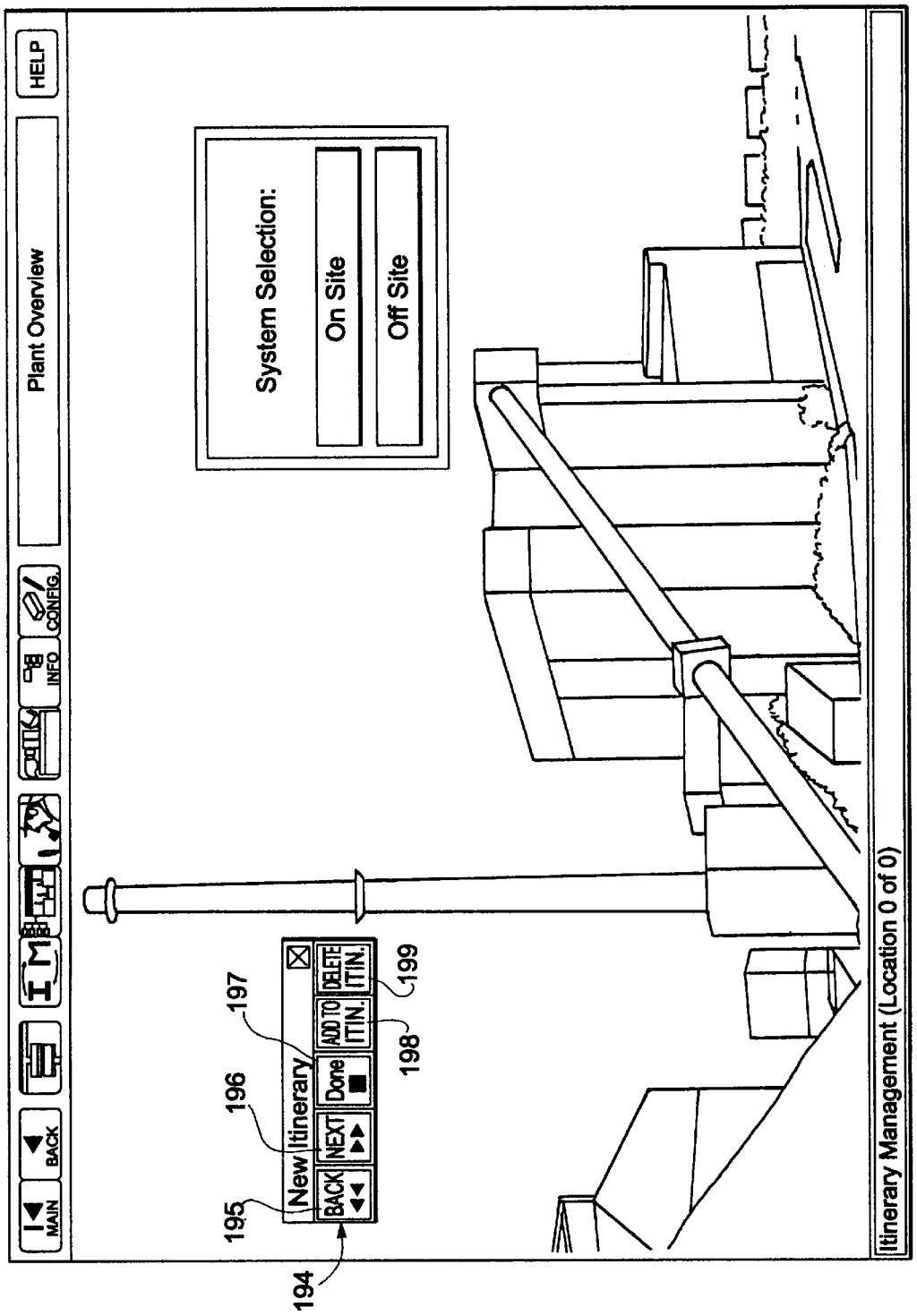

"Itinerary Manager" button 228 launches the itinerary manager and provides for grouping machinery in a particular manner by selecting them as the user navigates through the interface so that the user can do an analysis of that group as a subset of the plant. This is contrasted with the "Analyze System" button 232 which analyzes all machines at the plant. When button 228 is pressed, the screen of FIG. 12(a) is presented and allows a user to select and/or edit existing itineraries and to create a new itinerary. If the "New Itinerary . . . " button is pressed when the screen of FIG. 5(a) is displayed, for example, an itinerary manager toolbar 194 is overlaid onto the screen of FIG. 5(a) as shown in FIG. 12(b). The user can then navigate through the interface as described above and add locations to the new itinerary using the "Add to Itin." button 198. Locations may be deleted from the itinerary using "Delete Itin." button 199. "Back" button 195 and "Next" button 196 are used to move through the itinerary. When the user has completed the itinerary, pressing of the "Done" button 197 prompts the user to save the itinerary. When a user selects an existing itinerary from the screen of FIG. 12(a), the user is presented with a toolbar consisting of buttons 195, 196, and 197 to move through the selected itinerary. The itinerary manager function when applied to a portable hand-held data collector provides for the instruction to the user and the automatic control of collecting data in a predetermined sequence which has been defined at the time of creating that itinerary. The itinerary manager ensures that repetitive tasks are performed correctly. For example, if there are a certain set of test points that are to be collected regularly, e.g., every Tuesday, the itinerary manager can ensure that no test points are omitted. As noted, while the system is in learning mode, it records navigation through the system to the data points from which it is desired to collect data. The user navigates through the location of the data points to be collected and selects the "Add to Itin" button 198. This location will now be added. The user then navigates to the next location and adds it. This process is repeated until all of the data collection points are added. At that time, the user presses the "Done" button 197 and is prompted to name and save the itinerary. In this way, the system learns routes.

The next time the itinerary manager is opened, the newly added itinerary will be listed. One of the available itineraries may be highlighted and the "Select Itinerary" button is pressed. The button bar includes "Back", "Next", and "Done" buttons. Pressing the "Next" button takes the user to the first machine to collect data. Each time "Next" is pressed, the next machine will appear on the screen. When the route is complete, the "Done" button is pressed. Itineraries can be edited by highlighting the itinerary and pressing the "Edit Itinerary" button. The user can then add or delete locations in the itinerary by pressing the appropriate button.

"GraphMaker" button 230 launches the graphmaker function which is a customizing tool that allows a user to manually select specific vibration signatures for a plot. The user may superimpose a predetermined number of signatures for each plot. The GraphMaker function preferably generates the requested plots in multiple colors, complete with color-coded legend and functions as a customizing tool that allows a user to make specific comparisons not otherwise provided for in the system control program.

"Analyze System" button 232 allows a complete analysis of all points of every machine monitored by the system control program. Clicking on this button causes analysis to be performed on all points of all machines using the most recent data collected. Reports are then available for review.

"Tools" button 234 gives the user access to certain tools which may be provided within the software package. For example, a file manager may be provided to permit files to be deleted, copies, moved, and imported within the system control program environment.

Figure 13:
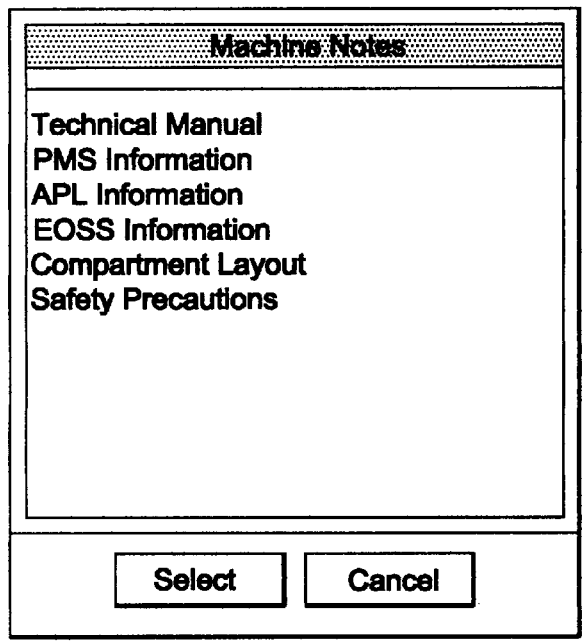
FIG. 13 is a screen from which information topics may be selected.

On certain screens, "Info" button 236 is enabled. When enabled and selected, the user may select from various information topics which are available as shown in FIG. 13. The control system of the invention permits the storage of related technical material. Options include text from technical manuals, schematic diagrams, specifications and standards, blueprints, block diagrams and the like. The "Info" structure may also include a text entry option so that the user can provide a comments file of descriptive materials which are unique to the machine that is displayed. These text entries may be used in addition to the analysis data base to track a machine's history.

"Configuration" button 238 allows the user to build and edit different types of data. The build function includes Automatic Alarms and System Interface. An order sheet is the file that contains the system alarms, wherein each line in the order sheet is a machine alarm. Creating automatic alarms runs the order sheet generator automatically. A manual alarm may be created using an order sheet editor in which the user enters the alarms himself/herself. The build function is used by experienced system builders to configure the system. The build functions may be password protected (using one or more password levels) to avoid inadvertent corruption of the system set-up. The edit function includes System Configuration, Data Files, System Alarms, Machine Characteristics, Reports Files, and Knowledge Base.

"Help" button 240 provides access to an on-line help system.

Appendlix I

As noted above, the graphical interface of the system of the invention is controlled by an "ini" or initialization file. This file controls all aspects of the interface including the presentation order of graphics, their position, the menu selections, a hyperlink's (zoom box's) position and number of data collection points, etc. The "ini" file is a text file and may be edited in any software that supports not only reading text files, but saving as text files. Typical examples include Microsoft Word®, Write, Notepad, etc. As noted above, the system control program of the present invention provides for the automatic modification of such a file during the generation of the interface. However, the user can also generate the interface as a text file as described below.

In order to explain the interface construction, text comments are provided describing each step.

```
[Paths]
BMP="c:\expert\bmp\online"
```

The first section of the file defines the paths to be used, specifically the path for the graphics. In this example, the path c:\expert\bmp\online stores the system images. Any path may be used for storage. However, a different path should be used for each system (e.g., on-site, off-site) to assist in disk management.

```
[Main]
Header_Caption="The Machine Expert - On Line"
Footer_Caption="System Support: 800-200-2038"
Icon_Caption="The Machine Expert"
```

The first part of the main section is self explanatory. The header is the text that appears at the top of the interface, the footer is the text that appears at the bottom of the interface. Since this text appears throughout the interface, it is used to provide support contact, company names, etc. The icon caption is the text that appears as a default under the icon in the program manager or under the icon when the system control program is run minimized.

```
Mode=-2
AniLength=16
AnalyzerType=2
SoftwareSetting=2
```

The next section of the main section is related to the software mode, animation length, hardware configuration, and software type. These values should not be changed by the user and are set for a specific application. Changing any one of these settings will significantly affect the mode of use of the system control program.

```
BackgroundBMP_File="grant.bmp"
BackgroundBMP_Left=0
BackgroundBMP_Top=0
```

This part of the main section selects the initial graphic to be displayed when the system control program is launched (e.g., graphical image 104 of FIG. 5(a)). In this case, a file called "grant.bmp" found in the directory defined in the path statement at the top of this "ini" file is used. The left and top value position the graphic on the screen, in this case at the top left corner, coordinates 0,0.

```
MenuPanel_Left=6000
MenuPanel_Top=1000
MenuPanel_Caption="System Selection:"
Select1=On Site
Select2=Off Site
```

This section concludes the main section of the interface and defines the position, i.e. top left coordinates, title and number of selection buttons that appear in the main screen (e.g., selection menu 106 of FIG. 5(a)). In this exemplary interface, a selection menu panel is positioned at 6000,1000 relative to the top left corner, with two buttons, one named "On Site" and the other named "Off Site". To add other buttons, the user can add a line to the file "Select 3=some name" and a button with that title will appear. The positioning of all screen items is done in "twips". This ensures that item on screen are always at the same position irrespective of resolution or screen size. There are approximately 1440 twips per inch and 567 twips per cm.

```
;OffSite *******************************************
```

Once a selection button has been selected, the system looks for a section of the ini file that begins with ["same name as the button name"]. The purpose of the line above is to provide some text that the user can easily see in the file that designates the start of a section. The presence of a ";" at the beginning of a line means that it is a comment line and any text that follows will be ignored by the system.

As described above once the "OffSite" button is selected, the system control program reads the section of the "ini" file that begins with [Offsite].

```
[Off Site]
Data_path=c:\expert\data\online\conv
BackgroundBMP_File="eastern.bmp"
BackgroundBMP_Left=0
BackgroundBMP_Top=0
```

The first part of this section of the file defines the path where the data will be stored related to this part of the facility or plant, or in this case, the off site machines. The next few lines of this section (as with the main section) identifies the graphic to be used and its on-screen position (e.g., graphical image 109 of FIG. 5(b)).

```
MainMenu_Caption=Off Site
```

This caption is in fact the text that appears on the main screen buttons and may be different than that used to describe the button and its corresponding "ini" file section.

```
ControlPanel_Top=14700
ControlPanel_Left=19000
```

The system control program provides for the collection, viewing, trending, and analysis of data from anywhere in the system, wherever there are matching measurement point buttons. The coordinates given above determine the position of a control panel (e.g., control panel 126). In the example, the control panel has been positioned off-screen with coordinates 14700,19000 since no data collection points have been positioned on this part of the interface.

```
Instructions_Left=200
Instructions_Top=16200
```

The system control program also provides for on-screen instructions to the user. However, again these instructions are not necessary at this point in the interface for collecting data since no data points are visible and again it has been positioned off screen with coordinates 200,16200.

```
Information1_Topic="Technical Manual"
Information1_File="c:\expert\bmp\online\56arm.bmp"
Information1_Type=BMP
Information2_Topic="PMS Information"
Information2_File="c:\expert\bmp\online\56arm.bmp"
Information2_Type=BMP
Information3_Topic="APL Information"
Information3_File="c:\expert\bmp\online\56arm.bmp"
Information3_Type=BMP
Information4_Topic="EOSS Information"
Information4_File="c:\expert\bmp\online\56arm.bmp"
Information4_Type=BMP
Information5_Topic="Compartment Layout"
Information5_File="c:\expert\bmp\online\56arm.bmp"
Information5_Type=BMP
Information6_Topic="Safety Precautions"
Information6_File="c:\expert\bmp\online\56arm.bmp"
Information6_Type=BMP
```

The next section of the file relates to information topics. There are six of them used in this example. Each topic has three lines of code associated therewith: the first provides the name; the second, the path and name of the file to be presented; and the third, the type of file, i.e. "bmp" for bitmap, "txt" for text file, etc. These information topics appear when the "Information" button is selected on the toolbar 100 and may change as the user navigates through the interface. For example, the information related to a particular machine is placed in the section of the "ini" file that relates to that machine. The topic name is what appears on the menu when the "Information" button is selected.

The next part of the file relates to hyperlinis that appear on the display. These hyperlinks are sometimes referred to as zoom boxes or zones.

```
Zone1=Dilworth
Zone2=Dilworth2
```

The interface of this example file has two zoom boxes (e.g., zoom boxes 110 and 112 of FIG. 5(b)). The system control program of the present invention supports any number of zoom boxes and once zoomed any number again such that the user can navigate through areas of the facility or plant. Each zone is given a name in the "ini" file and just like the system control program looks for the next set of instructions when a named button is selected, if zone "dilworth" is selected, the system control program looks for a part of the "ini" file that starts with [dilworth] to determine what to do next. Zone1 [dilworth] will be utilized in this example.

```
[Dilworth]
ControlPane_Top=14700
ControlPanel_Left=19000
Instructions_Left=200
Instructions_Top=16200
```

The first part of this section again illustrates that the system control program provides for instructions and a control panel if measurement points were located on this screen. However, in this example, since there are no measurement points, both the control panel and the instructions are positioned off-screen at coordinates 14700,19000 and 200,16200, respectively.

```
ZoneBox_Left=4200
ZoneBox_Top=3550
ZoneBox_Right=5900
ZoneBox_Bottom=4300
```

This section positions and sizes the zoom box. Each of the coordinates is relative to the top left of the screen.

```
BackgroundBMP_File="mine.bmp"
BackgroundBMP_Left=0
BackgroundBMP_Top=0
```

The image to be displayed and its position is again defined as before.

```
Zone1=conv1
Zone2=conv2
```

Again, once zoomed at the first level, two further zoom boxes or zones are available (e.g., zoom boxes 116 and 118 of FIG. 5(c)), again uniquely named.

The next section relates to the second of the zoom boxes on the map and, for purposes of this example, is identical to the first.

```
[Dilworth2]
ControlPanel_Top=14700
ControlPanel_Left=19000
Instructions_Left=200
Instructions_Top=16200
ZoneBox_Left=6200
ZoneBox_Top=2000
ZoneBox_Right=7900
ZoneBox_Bottom=2800
BackgroundBMP_File="mine.bmp"
BackgroundBMP_Left=0
BackgroundBMP_Top=0
Zone1=conv1
Zone2=conv2
```

It is noted that the names given to the zoom boxes on the second site are in fact the same as those used for the first site in order to simplify this example. Thus, in both cases in this example, which ever zone is selected on the map, the user is presented with the same picture of a mine site and are given the same two selections of plant locations, each with a name, conv1 and conv2. As before with screen actions, the system control program looks in the "ini" file for the corresponding section to the selection made for instructions.

```
[conv1]
Def_kbase="knw.KNW"
Instructions_Left=2500
Instructions_Top=16000
ZoneBox_Left=2100
ZoneBox_Top=3300
ZoneBox_Right=3100
ZoneBox_Bottom=4000
BackgroundBMP_File="conv.bmp"
BackgroundBMP_Left=0
BackgroundBMP_Top=0
ControlPanel_Top=4700
ControlPanel_Left=6500
L1_Top=2750
L1_Left=5400
L1_Caption="A"
L1_DataTag="A"
L2_Top=2750
L2_Left=2000
L2_Caption="B"
L2_DataTag="B"
[conv2]
Def_kbase="knw.KNW"
```

The user is now at a point in the system where measurement locations are displayed. Therefore, data may be collected through the use of functions on the control panel. At this point, the default knowledge base that will be used is set. This reference does not include the path since the system requires the knw files to be in the expert directory.

The system control program provides for the use of multiple knowledge bases. Hence, for each machine, the name of the knowledge base would be set. In this example, the same knowledge base is used throughout. The only disadvantage of the single large knw file is the speed of analysis. Therefore, for faster systems, a divided machine specific approach could be beneficial.

```
Instructions_Left=2500
Instructions_Top=16000
```

Again the instruction panel is considered unnecessary and is positioned off screen at 2500,16000

```
ZoneBox_Left=4600
ZoneBox_Top=2300
ZoneBox_Right=5600
ZoneBox_Bottom=3000
```

The zoom box is positioned and sized as before with relation in twips from the top left of the screen and the graphic to be displayed is referenced and its on screen position set.

```
BackgroundBMP_File="conv.bmp"
BackgroundBMP_Left=0
BackgroundBMP_Top=0
ControlPanel_Top=4700
ControlPanel_Left=6500
```

The next section of the file relates to the measurement positions and control panel. Unlike before, the control panel is needed on screen with the measurement point in order to perform system functions, here it is positioned at 4700,6500.

```
L1_Top=2750
L1_Left=5400
L1_Caption="A"
L1_DataTag="A"
L2_Top=2750
L2_Left=2000
L2_Caption="B"
L2_DataTag="B"
```

At this point in the system, there are two measurement positions used, A and B. Each position is defined by four parameters: the top and left position of the button on the screen; the label for that button; and the data tag. The data tag forms the first character of the file name given for data collected at that point. The rest of the file name is derived from the date and time of the data collection. The location of storage is defined by the data path described earlier. To add a measurement point, an appropriate section of the file may be copied, pasted, and then edited. For example,

```
L1_Top=2750
L1_Left=5400
L1_Caption="A"
L1_DataTag="A"
L2_Top=2750
L2_Left=2000
L2_Caption="B"
L2_DataTag="B"
``` becomes.

```
L1_Top=2750
L1_Left=5400
L1_Caption="A"
L1_DataTag="A"
L2_Top=2750
L2_Left=2000
L2_Caption="B"
L2_DataTag="B"
L1_Top=2750
L1_Left=5400
L1_Caption="A"
L1_DataTag="A"
``` which then becomes.

```
L1_Top=2750
L1_Left=5400
L1_Caption="A"
L1_DataTag="A"
L2_Top=2750
L2_Left=2000
L2_Caption="B"
L2_DataTag="B"
L3_Top=750
L3_Left=400
L3_Caption="C"
L3_DataTag="C"
```

The next section relates to the "On Site" choice from the main menu.

```
[On Site]
MainMenu_Caption="On Site"
ListBox_Left=6500
ListBox_Top=2000
ListBox_Caption="Machine Types:"
```

In this example, after the "On Site" main menu button is selected, a list box (e.g., list box 120 of FIG. 5(d)) appears giving a list of selections which have correspondingly named sections in this file. The items that appear in the list box are defined as on the main section, each selection then having a correspondingly named section in the file defining the systems actions.

```
Select1=acmotors
Select2=pumps
Select3=conveyors
Select4=fans
```

The remaining portion of the file contains elements all previously defined and reference may be made to the above sections for details. This section of the interface displays the location of electric motors. Only one zoom box is used.

```
[acmotors]
Data_path-c:\expert\data\online\acmotors
ListEntry_Caption="ACmotors"
ControlPanel_Top=14700
ControlPanel_Left=19000
Instructions_Left=200
Instructions_Top=16200
Information1_Topic="Technical Manual"
Information1_File="c:\expert\bmp\online\56arm.bmp"
Information1_Type=BMP
Information2_Topic="PMS Information"
Information2—File="c:\expert\bmp\online\56arm.bmp"
Information2_Type=BMP
Information3_Topic="APL Information"
Information3_File="c:\expert\bmp\online\56arm.bmp"
Information3_Type=BMP
Information4_Topic="EOSS Information"
Information4_File="c:\expert\bmp\online\56arm.bmp"
Information4_Type=BMP
Information5_Topic="Compartment Layout"
Information5_File="c:\expert\bmp\online\56arm.bmp"
Information5_Type=BMP
Information6_Topic="Safety Precautions"
Information6_File="c:\expert\bmp\online\56arm.bmp"
Information6_Type=BMP
BackgroundBMP_File="grant.bmp"
BackgroundBMP_Left=0
BackgroundBMP_Top=0
Zone1=ac
```

If the zoom box is selected, the user is taken to that motor and measurement points and the control panel is displayed.

```
[ac]
Def_kbase="knw.KNW"
Instructions_Left=2500
Instructions_Top=16000
ZoneBox_Left=4300
ZoneBox_Top=3500
ZoneBox_Right=5000
ZoneBox_Bottom=4000
BackgroundBMP_File="safan.bmp"
BackgroundBMP_Left=0
BackgroundBMP_Top=0
ControlPanel_Top=700
ControlPanel_Left=600
L1_Top=3000
L1_Left=6700
L1_Caption="A"
L1_DataTag="A"
L2_Top=3550
L2_Left=4000
L2_Caption="B"
L2_DataTag="B"
```

In exactly the same way, if conveyors is selected, those machines are shown on the plant picture and zooming takes the user to that machine again with the measurement positions displayed.

```
[conveyors]
Data_path=c:\expert\data\online\conv
ListEntry_Caption="Conveyors"
ControlPanel_Top=14700
ControlPanel_Left=19000
Instructions_Left=200
Instructions_Top=16200
Information1_Topic="Technical Manual"
Information1_File="c:\expert\bmp\online\56arm.bmp"
Information1_Type=BMP
Information2_Topic="PMS Information"
Information2_File="c:\expert\bmp\online\56arm.bmp"
Information2_Type=BMP
Information3_Topic="APL Information"
Information3_File="c:\expert\bmp\online\56arm.bmp"
Information3_Type=BMP
Information4_Topic="EOSS Information"
Information4_File="c:\expert\bmp\online\56arm.bmp"
Information4_Type=BMP
Information5_Topic="Compartment Layout"
Information5_File="c:\expert\bmp\online\56arm.bmp"
Information5_Type=BMP
Information6_Topic="Safety Precautions"
Information6_File="c:\expert\bmp\online\56arm.bmp"
Information6_Type=BMP
BackgroundBMP_File="grant.bmp"
BackgroundBMP_Left=0
BackgroundBMP_Top=0
Zone1=conv3
[conv3]
Def_kbase="knw.KNW"
Instructions_Left=2500
Instructions_Top=16000
ZoneBox_Left=4200
ZoneBox_Top=4300
ZoneBox_Right=5200
ZoneBox_Bottom=5200
BackgroundBMP_File="conv.bmp"
BackgroundBMP_Left=0
BackgroundBMP_Top=0
ControlPanel_Top=4700
ControPanel_Left=6000
L1_Top=2750
L1_Left=5400
L1_Caption="A"
L1_DataTag="A"
L2_Top=2750
L2_Left=2000
L2_Caption="B"
L2_DataTag="B"
```

Likewise with pumps, fans, etc.

```
[pumps]
Data_path=c:\expert\data\online\pumps
ListEntry_Caption="Pumps"
ControlPanel_Top=14700
ControlPanel_Left=19000
Instructions_Left=200
Instructions_Top=#16200
Information1_Topic="Technical Manual"
Information1_File="c:\expert\bmp\online\56arm.bmp"
Information1_Type=BMP
Information2_Topic="PMS Information"
Information2_File="c:\expert\bmp\online\56arm.bmp"
Information2_Type=BMP
Information3_Topic="APL Information"
Information3_File="c:\expert\bmp\online\56arm.bmp"
Information3_Type=BMP
Information4_Topic="EOSS Information"
Information4_File="c:\expert\bmp\online\56arm.bmp"
Information4_Type=BMP
Information5_Topic="Compartment Layout"
Information5_File="c:\expert\bmp\online\56arm.bmp"
Information5_Type=BMP
```

-continued

```
Information6_Topic="Safety Precautions"
Information6_File="c:\expert\bmp\online\56arm.bmp"
Information6_Type=BMP
BackgroundBMP_File="grant.bmp"
BackgroundBMP_Left=0
BackgroundBMP_Top=0
Zone1=feedpump
[feedpump]
Def_kbase="knw.KNW"
Instructions_Left=2500
Instructions_Top=16000
ZoneBox_Left=5600
ZoneBox_Top=5000
ZoneBox_Right=6500
ZoneBox_Bottom=5500
BackgroundBMP_File="machine2.bmp"
BackgroundBMP_Left=0
BackgroundBMP_Top=0
ControlPanel_Top=700
Controtpanel_Left=6500
L1_Top=4150
L1_Left=4650
L1_Caption="A"
L1_DataTag="A"
L2_Top=4500
L2_Left=2500
L2_Caption="B"
L2_DataTag="B"
[Fans]
Data_path=c:\expert\data\online\fans
ListEntry_Caption="Fans"
ControlPanel_Top=14700
ControlPanel_Left=19000
Instructions_Left=200
Instructions_Top=16200
Information1_Topic="Technical Manual"
Information1_File="c:\expert\bmp\online\56arm.bmp"
Information1_Type=BMP
Information2_Topic="PMS Information"
Information2_File="c:\expert\bmp\online\56arm.bmp"
Information2_Type=BMP
Information3_Topic="APL Information"
Information3_File="c:\expert\bmp\online\56arm.bmp"
Information3_Type=BMP
Information4_Topic="EOSS Information"
Information4_File="c:\expert\bmp\online\56arm.bmp"
Information4_Type=BMP
Information5_Topic="Compartment Layout"
Information5_File="c:\expert\bmp\online\56arm.bmp"
Information5_Type=BMP
Information6_Topic="Safety Precautions"
Information6_File="c:\expert\bmp\online\56arm.bmp"
Information6_Type=BMP
BackgroundBMP_File="grant.bmp"
BackgroundBMP_Left=0
BackgroundBMP_Top=0
Zone1=fan
[fan]
Def_kbase="knw.KNW"
Instructions_Left=2500
Instructions_Top=16000
ZoneBox_Left=7300
ZoneBox_Top=4500
ZoneBox_Right=8100
ZoneBox_Bottom=5500
BackgroundBMP_File="fan.bmp"
BackgroundBMP_Left=0
BackgroundBMP_Top=0
ControlPanel_Top=1200
ControlPanel_Left=840
L1_Top=3500
L1_Left=4000
L1_Caption="A"
LI_DataTag="A"
L2_Top=3550
L2_Left=6000
L2_Caption="B"
L2_DataTag="B"
```

Any patent document or other publication identified above is hereby incorporated by reference into the instant specification.

While there has been shown and described the preferred embodiments of the invention, it will be evident to those skilled in the art that various modifications may be made thereto without departing from the spirit and scope of the invention which is set forth in the appended claims.

We claim:

1. A predictive maintenance system for a plurality of machines, the predictive maintenance system comprising:
   vibration sensors connected to said machines;
   a plurality of data acquisition nodes, each node connected to one or more of said vibration sensors and each node acquiring vibration data from the sensors connected thereto during a respective data acquisition interval; and
   a system control computer for collecting vibration data acquired by said nodes during a polling cycle which is based on the longest of the respective data acquisition intervals of said nodes.

2. The predictive maintenance system according to claim 1, wherein the data acquisition interval of each node is dependent on the number of vibration sensors connected thereto.

3. The predictive maintenance system according to claim 2, wherein the data acquisition interval of each node is dependent on data acquisition parameters associated with the vibration sensors connected thereto.

4. The predictive maintenance system according to claim 3, wherein the data acquisition parameters include one or more of a frequency range for the data acquisition and a resolution of the data acquisition.

5. The predictive maintenance system according to claim 1, wherein said data acquisition nodes and said system control computer are arranged in a local area network (LAN).

6. The predictive maintenance system according to claim 1, wherein said data acquisition nodes and said system control computer are arranged in a wide area network (WAN).

7. The predictive maintenance system according to claim 1, wherein the length of the polling cycle is equal to the length of the longest of the respective data acquisition intervals of said nodes.

8. The predictive maintenance system according to claim 1, wherein the data acquisition for each node is continuous and independent of the other nodes.

9. The predictive maintenance system according to claim 1, wherein said system control computer polls each of said data acquisition nodes in series during the polling cycle.

10. The predictive maintenance system according to claim 9, wherein data acquisition nodes which are not polled continue to collect data from said vibration sensors.

11. The predictive maintenance system according to claim 1, wherein a time for analysis of data collected during the polling cycle is included in the polling cycle.

12. An interface for a predictive maintenance system for a plurality of machines connected in a network with a system control computer, said interface comprising a processor configured to process a plurality of graphical images arranged in a hierarchy including a first graphical image and a second graphical image, the second graphical image being linked to the first graphical image via a zoom box in the first graphical image.

13. The interface of claim 12, wherein at least one of the first and second graphical images comprises an image of at least a portion of at least one of the plurality of machines obtained from at least one of a digital camera and a photographic scanner.

14. The interface of claim 12, wherein the zoom box is selectable using at least one of a pointing device and a touch screen.

15. The interface of claim 12, wherein the interface is configured such that the second graphical image is presented responsive to the zoom box being selected.

16. The interface of claim 12, wherein the plurality of machines are located within a predetermined area, and wherein the first graphical image comprises a layout view of the area including locations of the plurality of machines.

17. The interface of claim 16, wherein the area is substantially an entire state or district of the United States.

18. The interface of claim 16, wherein a location of the zoom box within the first graphical image corresponds to a location of at least one of the plurality of machines within the area.

19. The interface of claim 16, wherein the second graphical image comprises a zoomed-in version of the first graphical image.

20. The interface of claim 12, wherein the second graphical image comprises a zoomed-in version of the first graphical image.

21. The interface of claim 12, wherein the plurality of machines includes a first machine, the first graphical image comprising a view of the first machine, a location of the zoom box in the first graphical image corresponding to a portion of the first machine.

22. The interface of claim 21, wherein the second graphical image comprises a zoomed-in view of the portion of the first machine.

23. The interface of claim 22, wherein the second graphical image further comprises a measurement point icon representing a measurement point, a location of the measurement point icon corresponding to a location of a data acquisition node in the first machine.

24. The interface of claim 23, further comprising a representation of data associated with the data acquisition node, the data being presented over a background, the background having a color associated with a severity of any problem with the first machine indicated by the data.

25. The interface of claim 12 wherein the zoom box comprises a rectangle having boundaries, the boundaries of the rectangle defining an approximate area of the first graphical image to be zoomed.

26. A computer-readable medium having computer-executable instructions for performing steps comprising:

assisting a user to create an interface for a predictive maintenance system for a plurality of machines connected in a network with a system control computer, said interface comprising a plurality of graphical images arranged in a hierarchy including a first graphical image and a second graphical image; and assisting the user to link the second graphical image to the first graphical image via a zoom box in the first graphical image.

27. A predictive maintenance system for a plurality of machines, each of the plurality of machines having a vibration sensor attached thereto for sensing a vibration of the respective machine and for generating vibration data associated with the vibration, the predictive maintenance system comprising:

a plurality of data acquisition nodes, each node connected to one or more of the vibration sensors and each node acquiring the vibration data from the sensors during a respective data acquisition interval; and a system control computer for collecting data associated with the vibration data acquired by each of the plurality of nodes during a polling cycle, the polling cycle being based on the longest of the respective data acquisition intervals of the nodes.

28. The predictive main system of claim 27, wherein the data is the vibration data.

29. The predictive maintenance system of claim 27, wherein the length of the polling cycle is equal to the length of the longest of the respective data acquisition intervals of the nodes.

30. A method of operating a predictive maintenance system for a plurality of machines each connected to at least one of a plurality of vibration sensors for sensing a vibration of a respective machine, wherein each of a plurality of data acquisition nodes are connected to one or more of the vibration sensors, the method comprising the steps of:

acquiring vibration data by the nodes from the vibration sensors during a respective data acquisition interval; and collecting data associated with at least a portion of the vibration data during a polling cycle, the polling cycle being based on the longest of the respective data acquisition intervals of the nodes.

31. The method of claim 30, wherein the data is the vibration data.

32. The method of claim 30, wherein the length of the polling cycle is equal to the length of the longest of the respective data acquisition intervals of the nodes.

* * * * *

UNITED STATES PATENT AND TRADEMARK OFFICE
CERTIFICATE OF CORRECTION

PATENT NO. : 5,963,884
DATED : October 5, 1999
INVENTOR(S) : Ralph D. Billington, et al.

It is certified that error appears in the above-identified patent and that said Letters Patent is hereby corrected as shown below:

Title Page,
Under [73] Assignee, delete "Machine Xpert" and in it's place insert
--MachineXpert--

Signed and Sealed this

Second Day of October, 2001

Attest:

NICHOLAS P. GODICI
Attesting Officer    Acting Director of the United States Patent and Trademark Office